United States Patent
Ninomiya

(10) Patent No.: US 11,002,338 B2
(45) Date of Patent: May 11, 2021

(54) DRIVE BELT

(71) Applicant: TOYOTA JIDOSHA KABUSHIKI KAISHA, Toyota (JP)

(72) Inventor: Keisuke Ninomiya, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 267 days.

(21) Appl. No.: 16/117,523

(22) Filed: Aug. 30, 2018

(65) Prior Publication Data

US 2019/0101183 A1 Apr. 4, 2019

(30) Foreign Application Priority Data

Sep. 29, 2017 (JP) .............................. JP2017-190692

(51) Int. Cl.
| | |
|---|---|
| *F16G 5/16* | (2006.01) |
| *F16G 5/00* | (2006.01) |
| *F16G 5/18* | (2006.01) |
| *F16G 1/24* | (2006.01) |

(52) U.S. Cl.
CPC ................ *F16G 5/16* (2013.01); *F16G 5/00* (2013.01); *F16G 1/24* (2013.01); *F16G 5/18* (2013.01)

(58) Field of Classification Search
CPC ... F16G 5/16; F16G 5/18; F16G 5/166; F16G 5/00; F16G 1/24; F16H 9/04; F16H 9/12; F16H 9/14
USPC ......................................................... 474/242
See application file for complete search history.

(56) References Cited

U.S. PATENT DOCUMENTS

| | | | | |
|---|---|---|---|---|
| 4,501,578 A | * | 2/1985 | Schneider ............... | F16G 5/166 474/201 |
| 4,968,288 A | * | 11/1990 | Lecouturier .............. | F16G 5/16 474/242 |
| 6,679,798 B1 | * | 1/2004 | Takagi ...................... | F16G 5/16 474/242 |
| 2002/0137585 A1 | | 9/2002 | Smeets et al. | |
| 2007/0072721 A1 | * | 3/2007 | Takagi ...................... | F16G 5/16 474/242 |

(Continued)

FOREIGN PATENT DOCUMENTS

| | | |
|---|---|---|
| EP | 1662174 A1 | 5/2006 |
| JP | 2017-516966 A | 6/2017 |

(Continued)

*Primary Examiner* — Michael R Mansen
*Assistant Examiner* — Raveen J Dias
(74) *Attorney, Agent, or Firm* — Oliff PLC

(57) ABSTRACT

A drive belt includes a hoop and multiple elements joined together in a loop by the hoop. Each element has an assembly space into which one end portion of the hoop is inserted during assembly. Each element is configured such that a first opening width, which is a distance between a first hook and a second hook, is less than a width of the hoop, and a second opening width, which is a distance between the second hook and a contact site where the one end portion of the hoop housed in the assembly space contacts a first pillar, is greater than the width of the hoop. The first hook and the second hook respectively include a first displacement-restriction surface and a second displacement-restriction surface each configured to restrict relative displacement between the element and the hoop by contacting a corresponding one of edges of the hoop.

7 Claims, 11 Drawing Sheets

(56) References Cited

U.S. PATENT DOCUMENTS

| | | | |
|---|---|---|---|
| 2009/0258743 A1* | 10/2009 | Kobayashi | F16G 5/16 474/248 |
| 2010/0016112 A1* | 1/2010 | Kobayashi | B29D 29/10 474/255 |
| 2010/0016113 A1* | 1/2010 | Kobayashi | F16G 5/16 474/261 |
| 2011/0201467 A1* | 8/2011 | Kobayashi | F16G 5/16 474/240 |
| 2011/0237376 A1 | 9/2011 | Sano | |
| 2011/0300980 A1* | 12/2011 | Kuwabara | F16G 5/16 474/242 |
| 2012/0190490 A1* | 7/2012 | Morino | F16G 5/16 474/240 |
| 2019/0032750 A1* | 1/2019 | Brandsma | F16G 5/16 |
| 2019/0101185 A1* | 4/2019 | Ninomiya | F16G 5/16 |
| 2019/0101186 A1* | 4/2019 | Ninomiya | F16G 5/16 |
| 2019/0101187 A1* | 4/2019 | Ninomiya | F16G 5/16 |
| 2019/0154112 A1* | 5/2019 | Ochi | F16G 5/16 |
| 2019/0154113 A1* | 5/2019 | Sato | F16G 5/16 |
| 2019/0234486 A1* | 8/2019 | Inase | F16G 5/16 |
| 2019/0346016 A1* | 11/2019 | Van Treijen | F16G 5/16 |
| 2020/0103000 A1* | 4/2020 | Takahashi | F16G 5/16 |
| 2020/0132160 A1* | 4/2020 | Inase | F16G 5/16 |
| 2020/0300335 A1* | 9/2020 | Ochi | B21D 53/14 |

FOREIGN PATENT DOCUMENTS

| | | |
|---|---|---|
| WO | 2011/061850 A1 | 5/2011 |
| WO | 2015/177372 A1 | 11/2015 |

\* cited by examiner

DRIVE BELT

INCORPORATION BY REFERENCE

The disclosure of Japanese Patent Application No. 2017-190692 filed on Sep. 29, 2017 including the specification, drawings and abstract is incorporated herein by reference in its entirety.

BACKGROUND

1. Technical Field

The disclosure relates to a drive belt including a hoop having a band shape, and multiple elements having a plate-piece shape, which are arrayed in a uniform orientation and joined together in a loop by the hoop.

2. Description of Related Art

Published Japanese Translation of PCT Application No. 2017-516966 (JP 2017-516966 A) describes a drive belt for a continuously variable transmission. The drive belt described in JP 2017-516966 A includes a hoop having a band shape (i.e., an endless carrier), and multiple elements having a plate-piece shape (i.e., multiple transverse members). Each of the multiple elements includes a base portion and two pillars. The two pillars are provided respectively at two ends of the base portion in its width direction. An opening is defined between the two pillars, and the hoop is disposed in the opening. Further, a part of the base portion, which is located between the two pillars, is provided with a saddle surface. The hoop is assembled to the saddle surface. The multiple elements are arrayed in a row along the circumferential direction of the hoop. Each of the multiple elements includes a first pillar that is one of the two pillars and that is disposed on one side in the width direction of the element (hereinafter, referred to as "element-width direction"), and a second pillar that is the other one of the two pillars and that is disposed on the other side in the element-width direction. The multiple elements include at least two types of elements (i.e., Type-I elements and Type-II elements). In each of the Type-I elements, the first pillar is provided with a first hook extending from the first pillar toward a center portion of the element in the element-width direction. The first hook holds the hoop disposed on the saddle surface, thereby preventing the element from being detached from the hoop. In each of the Type-I elements, the second pillar is provided with a second hook that is significantly smaller than the first hook. In each of the Type-II elements, the second pillar is provided with a first hook, and the first pillar is provided with a second hook that is significantly smaller than the first hook. In other words, the positional relationship between the first hook and the second hook in the element-width direction in the Type II element is opposite to that in the Type-I element. The Type-I elements and the Type-II elements are arrayed alternately or randomly in the circumferential direction. The first pillar of each element is provided with a boss (i.e., a protrusion) and a dimple (i.e., a recess). Further, the second pillar of each element is provided with a boss and a dimple. When the bosses of each of the elements are engaged with the dimples of an adjacent one of the elements, the elements adjacent to each other in the circumferential direction are aligned with each other and relative displacement between the elements is restricted. The hoop is disposed between the hooks and the base portions of the Type-I and Type II elements, thereby joining the multiple elements together in a loop. The configuration of the drive belt is as described above.

SUMMARY

As described above, in each element of the drive belt described in JP 2017-516966 A, only one pillar is provided with the first hook that is large in size. The second hook provided on the other pillar is significantly smaller than the first hook. The protruding length of the second hook is set to be, for example, equal to or less than half the difference between the width of the opening in the element-width direction and the width of the hoop. Thus, when each element is alone, the second hook does not interfere with the hoop in the course of inserting the hoop into the opening provided at a central region of the element. As a result, the element and the hoop can be easily assembled together. The position of the first hook of the Type-I element and the position of the first hook of the Type-II element are bilaterally symmetrical in the element-width direction. When the Type-I elements and the Type-II elements are arrayed in combination, the two end portions of the hoop in its width direction are held respectively by the first hook of each of the Type-I elements and the first hook of each of the Type-II elements. As a result, the elements are prevented from being detached from the hoop. However, when the hoop becomes elongated or abrasion or buckling occurs in engagement portions of the elements due to, for example, aging deterioration of the drive belt, the clearance between the adjacent elements increases, which may result in disengagement of the bosses of each of the elements from the dimples of an adjacent one of the elements. Once the bosses are disengaged from the dimples, the elements become displaceable independently from each other. In this state, if, for example, vibrations propagate to the drive belt and the elements are displaced in the element-width direction under the influence of the vibrations, the ends of the hoop are easily detached from the second hooks because the second hooks are significantly small. As a result, the elements may drop in the direction of gravity, for example, under their own weight. That is, the elements may be detached from the hoop.

The disclosure provides a drive belt including multiple elements each having an opening that is provided at a central region of the element in its width direction, and a hoop disposed in the openings of the elements, the drive belt being configured such that the elements and the hoop are easily assembled together and the elements are reliably prevented from being detached from the hoop.

An aspect of the disclosure relates to a drive belt including a hoop having a band shape, and multiple elements having a plate-piece shape, which are arrayed and joined together in a loop by the hoop. The hoop includes an inner peripheral surface, an outer peripheral surface, and two side surfaces connecting the inner peripheral surface and the outer peripheral surface to each other. Each of the multiple elements includes a base portion, a first pillar, a second pillar, a first hook, and a second hook. The base portion includes a first end portion and a second end portion that are two end portions in an element-width direction of the element. The base portion includes a saddle surface. The saddle surface is provided at a part of an upper end of the base portion. The part of the upper end, at which the saddle surface is provided, is located between the first end portion and the second end portion. The saddle surface is configured to come into contact with the inner peripheral surface of the hoop. The first pillar extends upward from the upper end of the base portion, and the first pillar is provided at the first end portion of the base portion. The second pillar extends upward from the upper end of the base portion, and the second pillar is provided at the second end portion of the base portion. The first hook extends from the first pillar toward the second pillar. The second hook extends from the second pillar toward the first pillar. Each of the multiple elements has an assembly space provided at a position adjacent to a root portion of the first pillar and between the base portion and the first hook. The assembly space is defined such that one of two end portions of the hoop in a hoop-width direction of the hoop is inserted into the assembly space during assembly of the element and the hoop. A first opening width that is a distance between a distal end of the first hook and a distal end of the second hook is less than a width of the hoop. A second opening width that is a distance between a contact site and the distal end of the second hook is greater than the width of the hoop. The contact site is a site at which one of the two side surfaces of the hoop comes into contact with the first pillar when one of the two end portions of the hoop is inserted into the assembly space and brought into contact with the first pillar. A first displacement-restriction surface is provided in a lower surface of the first hook. The lower surface of the first hook faces the saddle surface. The first displacement-restriction surface is configured to restrict relative displacement between the element and the hoop by coming into contact with one of two edges of the outer peripheral surface of the hoop when the element and the hoop disposed on the saddle surface are displaced relative to each other in the element-width direction. A second displacement-restriction surface is provided in a lower surface of the second hook. The lower surface of the second hook faces the saddle surface. The second displacement-restriction surface is configured to restrict relative displacement between the element and the hoop by coming into contact with the other one of the two edges of the outer peripheral surface of the hoop when the element and the hoop disposed on the saddle surface are displaced relative to each other in the element-width direction.

In the above aspect, the first displacement-restriction surface may be a first inclined surface configured such that a distance between the first displacement-restriction surface and a predetermined virtual plane that includes the saddle surface and that is flush with the saddle surface is greater than a thickness of the hoop at a position close to a center portion of the saddle surface and is less than the thickness of the hoop at a position apart from the hoop disposed on the saddle surface, in a direction toward the first pillar along the element-width direction. Further, the second displacement-restriction surface may be a second inclined surface configured such that a distance between the second displacement-restriction surface and the predetermined virtual plane is greater than the thickness of the hoop at a position close to the center portion of the saddle surface and is less than the thickness of the hoop at a position apart from the hoop disposed on the saddle surface, in a direction toward the second pillar along the element-width direction.

In the above aspect, at least one of the first inclined surface and the second inclined surface may be a curved surface or a combination of a plurality of flat surfaces having different inclinations with respect to the saddle surface.

In the above aspect, at least one of the first inclined surface and the second inclined surface may be a flat surface inclined at a predetermined inclination with respect to the saddle surface.

In the above aspect, the assembly space may be a space defined by the first inclined surface, an inner wall surface of the first pillar, which faces the second pillar, and a guide surface that is a curved surface or a flat surface extending from an end portion of the saddle surface, which is on the first pillar side. The guide surface is inclined with respect to the saddle surface in the same direction as a direction in which the first inclined surface is inclined with respect to the saddle surface.

In the above aspect, each of the multiple elements may be configured such that the second opening width is greater than a diagonal distance of the hoop. The diagonal distance is a distance between one of the two edges of the outer peripheral surface of the hoop and one of two edges of the inner peripheral surface of the hoop, and the one of the two edges of the outer peripheral surface is located diagonal to the one of two edges of the inner peripheral surface.

In the above aspect, each of the multiple elements may include a first boss, a first dimple, a second boss, and a second dimple. The first boss protrudes outwardly from a front surface of the first pillar. The front surface of the first pillar is one of two surfaces of the first pillar in a plate-thickness direction of the element. The first dimple is recessed inwardly from a rear surface of the first pillar. The rear surface of the first pillar is the other one of the two surfaces of the first pillar in the plate-thickness direction. The second boss protrudes outwardly from a front surface of the second pillar. The front surface of the second pillar is one of two surfaces of the second pillar in the plate-thickness direction. The second dimple is recessed inwardly from a rear surface of the second pillar. The rear surface of the second pillar is the other one of the two surfaces of the second pillar in the plate-thickness direction. The first boss of each of the multiple elements is engaged with the first dimple of an adjacent one of the multiple elements in a circumferential direction of the hoop. The second boss of each of the multiple elements is engaged with the second dimple of an adjacent one of the multiple elements in the circumferential direction of the hoop.

In the above aspect, each of the multiple elements may include a boss and a dimple. The boss is provided at a central portion of the base portion in the element-width direction. The boss protrudes outwardly from a front surface of the base portion. The front surface of the base portion is one of two surfaces of the base portion in the plate-thickness direction of the element. The dimple is provided at the central portion of the base portion in the element-width direction. The dimple is recessed inwardly from a rear surface of the base portion. The rear surface of the base portion is the other one of the two surfaces of the base portion in the plate-thickness direction. The boss of each of the multiple elements is engaged with the dimple of an adjacent one of the multiple elements in a circumferential direction of the hoop.

In the drive belt, each of the multiple elements is configured such that the shape of the space provided adjacent to the root portion of the first pillar and the shape of the space provided adjacent to the second pillar are bilaterally asymmetrical in the element-width direction. The space provided adjacent to the first pillar is larger than the space provided adjacent to the second pillar. The space provided adjacent to the first pillar of each element is used as the assembly space into which one end portion of the hoop is inserted such that the one end portion comes close to the root portion of the first pillar when the element and the hoop are assembled together. Each element includes the first hook and the second hook configured to maintain the state in which the element and the hoop have been assembled together. The first opening width that is the distance between the first hook and the second hook is less than the width of the hoop. Further, the assembly space described above is provided. Thus, the hoop that has been inclined with respect to the element with one end portion of the hoop inserted in the assembly space can be easily passed through the space between the first hook and the second hook. As a result, the element and the hoop can be easily assembled together.

In the drive belt, the first displacement-restriction surface is provided in the lower surface of the first hook, and the second displacement-restriction surface is provided in the lower surface of the second hook. The first displacement-restriction surface and the second displacement-restriction surface are configured to restrict relative displacement between the element and the hoop in the element-width direction. The first displacement-restriction surface and the second displacement-restriction surface are respectively a first inclined surface and a second inclined surface that face each other and that face the saddle surface of the element. Thus, when the element and the hoop are displaced relative to each other in the element-width direction, one of the two edges of the outer peripheral surface of the hoop comes into contact with the first displacement-restriction surface or the second displacement-restriction surface. That is, even if relative displacement between the hoop disposed on the saddle surface and the element occurs, one of the two edges of the outer peripheral surface of the hoop immediately comes into contact with the first displacement-restriction surface or the second displacement-restriction surface, so that further relative displacement is prevented. Therefore, it is possible to prevent significant relative displacement that causes the element to be detached from the hoop.

In the drive belt, the first displacement-restriction surface and the second displacement-restriction surface are configured such that the distance between each of the first displacement-restriction surface and the second displacement-restriction surface and the predetermined virtual plane that includes the saddle surface and that is flush with the saddle surface is greater than the thickness of the hoop at a position close to the center portion of the saddle surface and is less than the thickness of the hoop at a position apart from the hoop disposed on the saddle surface, in a direction toward a corresponding one of the first pillar and the second pillar along the element-width direction. As described above, the first displacement-restriction surface and the second displacement-restriction surface are respectively the first inclined surface and the second inclined surface that face each other and that face the saddle surface of the element. Thus, it is possible to restrict relative displacement between the element and the hoop in the element-height direction, and to restrict relative displacement between the element and the hoop in the element-width direction. As a result, it is possible to reliably prevent the element from being detached from the hoop.

As described above, the first displacement-restriction surface and the second displacement-restriction surface are respectively the first inclined surface and the second inclined surface that face each other. Thus, in the course of temporarily inserting one end portion of the hoop into the assembly space of the element, the hoop can be easily inclined with respect to the element, so that the one end portion of the hoop can be easily inserted into the assembly space. Further, in the course of pulling the one end portion of the hoop out of the assembly space and fitting the other end portion of the hoop into a space between the saddle surface and the second hook that is not provided with the assembly space, the other end portion of the hoop can be prevented from interfering with the second hook, so that the hoop can be easily displaced onto the saddle surface of the element. Thus, it is possible to easily assemble the element and the hoop together. Therefore, in the drive belt according to the above aspect of the disclosure, it is possible to easily assemble the element and the hoop together and to reliably prevent or restrain the element from being detached from the hoop.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Hereinafter, example embodiments of the disclosure will be described with reference to the accompanying drawings. Note that the following embodiments are just example embodiments and are therefore not intended to limit the disclosure.

Figure 1:
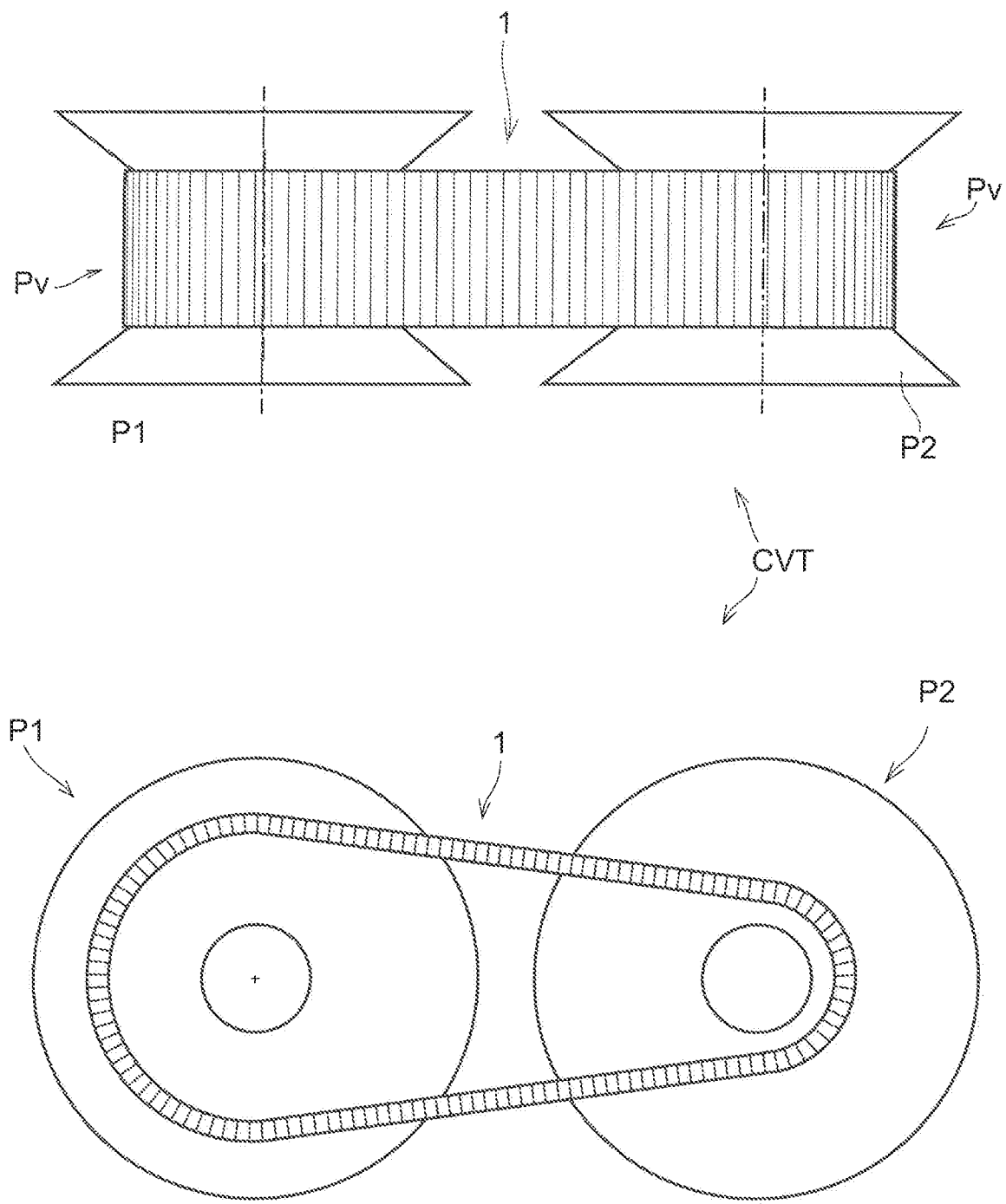
FIG. 1 illustrates an example of a drive belt according to an embodiment, FIG. 1 illustrating a state where the drive belt is looped over pulleys of a belt-driven power transmission apparatus (i.e., a belt-driven continuously variable transmission)

A drive belt according to an embodiment of the disclosure is used as a V-belt for a belt-driven power transmission apparatus in which power is transmitted between two pulleys. The drive belt according to the present embodiment is used in, for example, a belt-driven continuously variable transmission mounted in a vehicle. In an example illustrated in FIG. 1, a drive belt 1 is looped over a pulley groove Pv of each of a drive pulley P1 and a driven pulley P2 (hereinafter, collectively referred to as "pulleys P1, P2" where appropriate) of a belt-driven continuously variable transmission CVT. The drive belt 1 transmits torque by using a frictional force generated between the drive belt 1 and the pulleys P1, P2.

Figure 2:
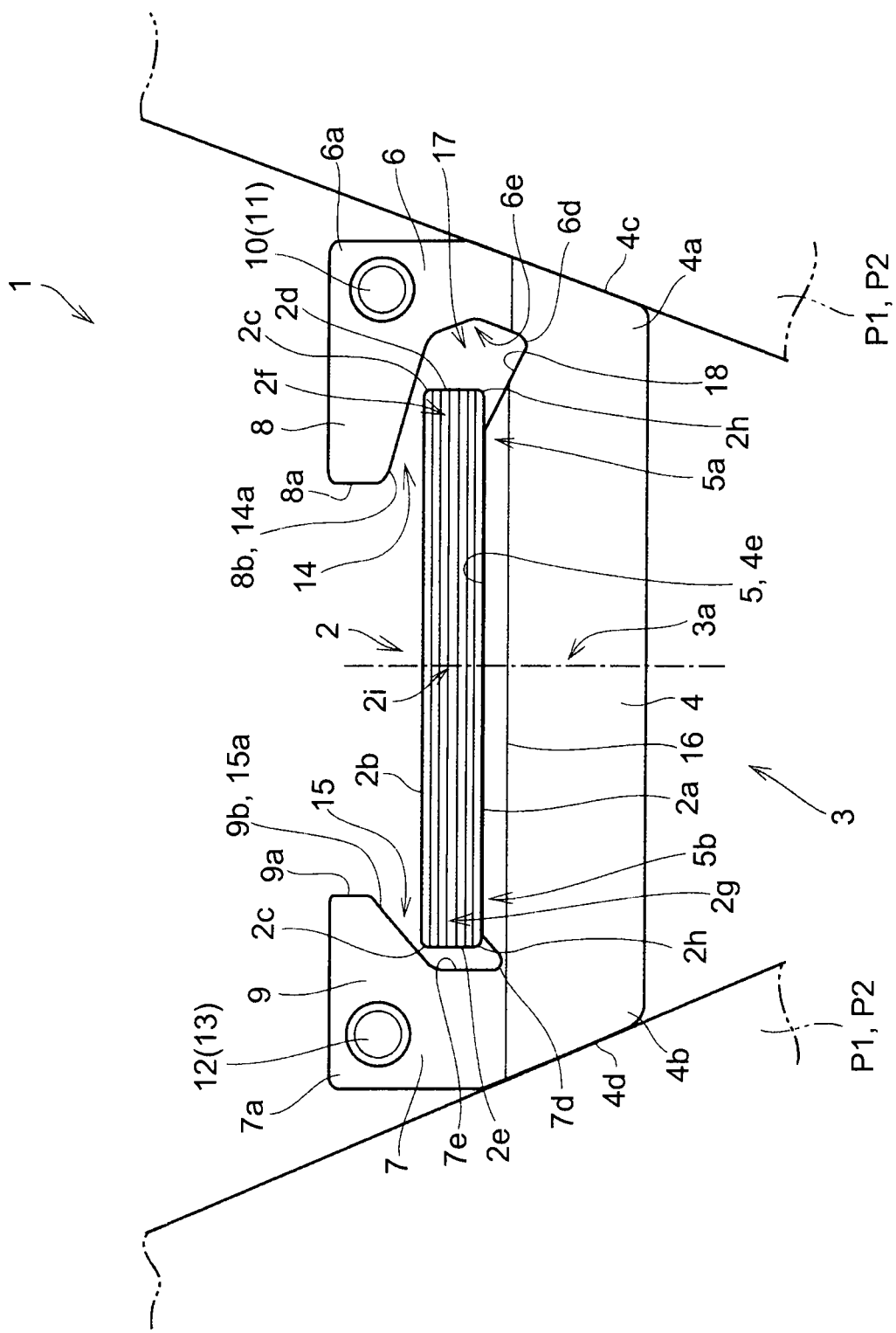
FIG. 2 is a view illustrating the configuration of the drive belt, FIG. 2 including a front view of each element illustrating the configuration of the element and a sectional view of a hoop illustrating the configuration of the hoop.
Figure 3:
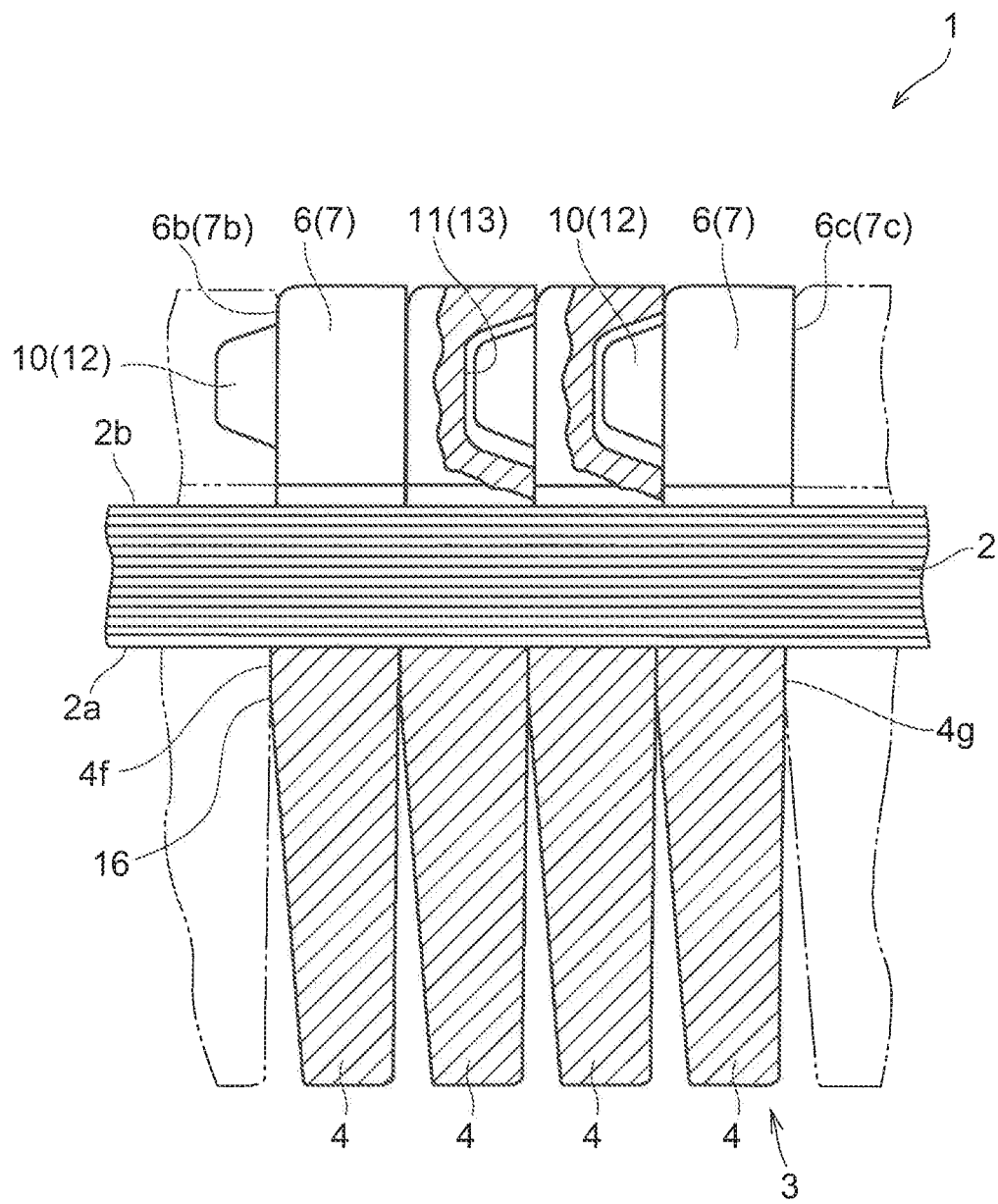
FIG. 3 is a view illustrating the configuration of the drive belt, FIG. 3 being a side view (partial sectional view) illustrating the configurations of the elements and the hoop.

For example, as illustrated in FIG. 2 and FIG. 3, the drive belt 1 includes a hoop 2 having a band shape, and multiple (e.g., several hundreds of) elements 3 having a plate-piece shape. The multiple elements 3 are arrayed in a uniform orientation and joined together in a loop by the hoop 2, whereby the drive belt 1 is formed.

Figure 4:
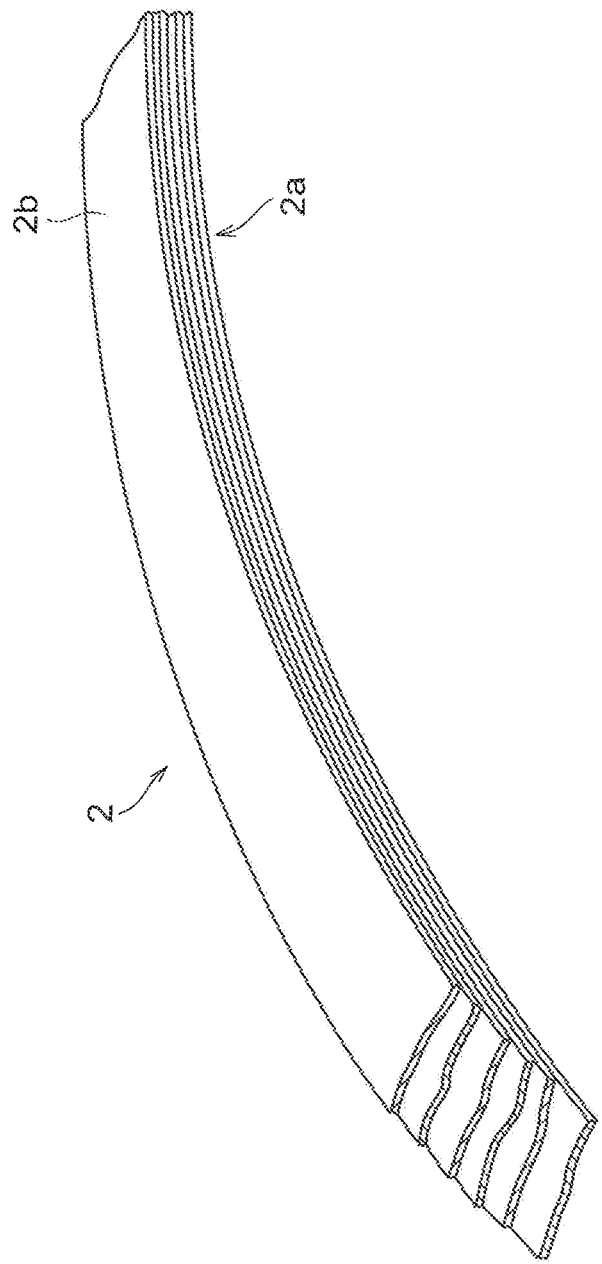
FIG. 4 is a view illustrating the configuration the hoop of the drive belt.

As described above, the hoop 2 is a member used to join and hold the multiple elements 3 together in a loop. For this reason, the hoop 2 is required to have a flexibility high enough to allow the loop diameter of the drive belt 1 to flexibly vary in the course of (i.e., in the process of) looping the drive belt 1 over the pulleys P1, P2, and the hoop 2 is required to have a tensile strength high enough to allow the hoop 2 to withstand a transmission torque and a compression force received from the pulleys P1, P2 during power transmission. In view of this, for example, as illustrated in FIG. 4, the hoop 2 includes a plurality of band-shaped metal members having flexibility, such as steel bands, that are overlapped with each other in their plate-thickness direction.

Each element 3 is, for example, a metal member having a plate-piece shape. Each element 3 includes, as main portions, a base portion 4 provided with a saddle surface 5, a first pillar 6 provided with a first boss 10 and a first dimple 11, a second pillar 7 provided with a second boss 12 and a second dimple 13, a first hook 8, and a second hook 9.

The base portion 4 is a body portion of the element 3. One end portion of the base portion 4 in the width direction of the element 3 (i.e., the lateral direction in FIG. 2; hereinafter referred to "element-width direction") is a first end portion 4a, and the other end portion of the base portion 4 in the element-width direction is a second end portion 4b. In an example illustrated in FIG. 2, the right end portion of the base portion 4 is the first end portion 4a, and the left end portion of the base portion 4 is the second end portion 4b. An end surface 4c of the first end portion 4a and an end surface 4d of the second end portion 4b are inclined so as to conform to tapered surfaces of the pulleys P1, P2, which define the pulley grooves Pv. The right and left end surfaces 4c, 4d are so-called flank surfaces of the element 3. The right and left end surfaces 4c, 4d are in frictional contact with the tapered surfaces of the pulleys P1, P2, which define the pulley grooves Pv, whereby torque is transmitted between the pulleys P1, P2 and the drive belt 1.

The saddle surface 5 is in contact with an inner peripheral surface 2a of the hoop 2 when the element 3 and the hoop 2 have been assembled together. The saddle surface 5 is provided in an upper end surface 4e of the base portion 4 in the height direction of the element 3 (i.e., the up-down direction in FIG. 2 and FIG. 3; hereinafter referred to as "element-height direction"). Specifically, the saddle surface 5 is a part of the upper end surface 4e, which is located between the first pillar 6 and the second pillar 7 that are provided respectively at the first end portion 4a and the second end portion 4b of the base portion 4 as described below.

The first pillar 6 is provided at the first end portion 4a of the base portion 4 so as to extend upward (i.e., so as to rise) beyond the saddle surface 5. In the example illustrated in FIG. 2, the first pillar 6 extends upward in the element-height direction from the first end portion 4a of the base portion 4, which is provided on the right side in the element-width direction. The first pillar 6 is integral with the base portion 4.

The second pillar 7 is provided at the second end portion 4b of the base portion 4 so as to extend upward (i.e., so as to rise) beyond the saddle surface 5. In the example illustrated in FIG. 2, the second pillar 7 extends upward in the element-height direction from the second end portion 4b of the base portion 4, which is provided on the left side in the element-width direction. The second pillar 7 is integral with the base portion 4.

The first end portion 4a is a portion (including the end surface 4c) around one end (i.e., the right end in FIG. 2) of the base portion 4 in the element-width direction. Therefore, the first pillar 6 may extend upward in the element-height direction from the first end portion 4a including the end surface 4c. In other words, the first pillar 6 may extend upward so as to be continuous with the end surface 4c at the same inclination as that of the end surface 4c. However, the first pillar 6 need not extend upward so as to be continuous with the end surface 4c at the same inclination as that of the end surface 4c. For example, the first pillar 6 may extend upward in the element-height direction from the first end portion 4a at an inclination different from that of the end surface 4c. In other words, the first pillar 6 may extend upward, without being continuous with the end surface 4c. For example, the first pillar 6 may extend upward from a position that is apart from the end surface 4c in a direction toward a center portion 3a of the base portion 4. In the example illustrated in FIG. 2, the first pillar 6 extends upward so as to be perpendicular to or substantially perpendicular to the saddle surface 5, without being continuous with the end surface 4c.

Similarly, the second end portion 4b is a portion (including the end surface 4d) around the other end (i.e., the left end in FIG. 2) of the base portion 4 in the element-width direction. Therefore, the second pillar 7 may extend upward in the element-height direction from the second end portion 4b including the end surface 4d. In other words, the second pillar 7 may extend upward so as to be continuous with the end surface 4d at the same inclination as that of the end surface 4d. However, the second pillar 7 need not extend upward so as to be continuous with the end surface 4d at the same inclination as that of the end surface 4d. For example, the second pillar 7 may extend upward in the element-height direction from the second end portion 4b at an inclination different from that of the end surface 4d. In other words, the second pillar 7 may extend upward, without being continuous with the end surface 4d. For example, the second pillar 7 may extend upward from a position that is apart from the end surface 4d in a direction toward the center portion 3a of the base portion 4. In the example illustrated in FIG. 2, the second pillar 7 extends upward so as to be perpendicular to or substantially perpendicular to the saddle surface 5, without being continuous with the end surface 4d.

Thus, in the example illustrated in FIG. 2, neither the first pillar 6 nor the second pillar 7 comes into contact with the pulleys P1, P2, so that neither the first pillar 6 nor the second pillar 7 receives loads from the pulleys P1, P2. In other words, no force is applied in the element-width direction from the pulleys P1, P2 to the first pillar 6 and the second pillar 7. This improves the durability and reliability of the first pillar 6 and the second pillar 7.

The first hook 8 extends from the first pillar 6 toward the center portion 3a of the base portion 4 in the element-width direction. Specifically, the first hook 8 protrudes toward the center portion 3a from an upper end portion 6a of the first pillar 6 in the element-height direction. The first hook 8 is integral with the first pillar 6 and the base portion 4.

The center portion 3a is the center of the base portion 4 in the element-width direction in terms of shape, or the center of the base portion 4 in the element-width direction in terms of dimensions. That is, the center portion 3a is a centerline indicating the center position of the base portion 4 in the element-width direction. The center portion 3a is a portion at which the distance between the end surface 4c of the first end portion 4a and the end surface 4d of the second end portion 4b is equally divided.

The second hook 9 extends from the second pillar 7 toward the center portion 3a of the base portion 4 in the element-width direction. Specifically, the second hook 9 protrudes toward the center portion 3a from an upper end portion 7a of the second pillar 7 in the element-height direction. The second hook 9 is integral with the second pillar 7 and the base portion 4.

The first hook 8 includes a first displacement-restriction surface 14, and the second hook 9 includes a second displacement-restriction surface 15. When the element 3 and the hoop 2 disposed on the saddle surface 5 are displaced relative to each other in the element-width direction, the first displacement-restriction surface 14 or the second displacement-restriction surface 15 comes in contact with one of two edges 2c of an outer peripheral surface 2b of the hoop 2, thereby restricting further relative displacement between the element 3 and the hoop 2. The two edges 2c are two ends of the outer peripheral surface 2b of the hoop 2 in the width direction of the hoop 2 (the lateral direction in FIG. 2; hereinafter referred to as "hoop-width direction"). The two edges 2c are corner portions at which a side surface 2d and a side surface 2e meet the outer peripheral surface 2b. The side surface 2d is one of two side surfaces of the hoop 2 in the hoop-width direction, and the side surface 2e is the other one of the two side surfaces of the hoop 2 in the hoop-width direction. The concrete shapes of the first hook 8 and the second hook 9, the concrete shapes of the first displacement-restriction surface 14 and the second displacement-restriction surface 15, and the operations and advantageous effects achieved from these concrete shapes will be described later in detail.

The first boss 10 is provided at the upper end portion 6a of the first pillar 6. Specifically, the first boss 10 protrudes outwardly from a front surface 6b of the first pillar 6, which is one of two surfaces of the first pillar 6 in a plate-thickness direction of the element 3 (i.e., the lateral direction in FIG. 3; hereinafter referred to as "element-thickness direction"). The first boss 10 of each element 3 (i.e., each of the multiple elements 3) is configured to be loosely engaged with the first dimple 11 of the adjacent element 3 (i.e., an adjacent one of the multiple elements 3 in the circumferential direction of the hoop 2) when the elements 3 and the hoop 2 have been assembled together.

The first dimple 11 is provided at the upper end portion 6a of the first pillar 6. Specifically, the first dimple 11 is recessed inwardly from a rear surface 6c of the first pillar 6, which is the other one of the two surfaces of the first pillar 6 in the element-thickness direction. The first dimple 11 of each element 3 is configured such that the first boss 10 of the adjacent element 3 is loosely engaged with the first dimple 11 of the element 3 when the elements 3 and the hoop 2 have been assembled together. Thus, in the drive belt 1, the first boss 10 of each element 3 is engaged with the first dimple 11 of the adjacent element 3 in the circumferential direction.

Similarly, the second boss 12 is provided at the upper end portion 7a of the second pillar 7. Specifically, the second boss 12 protrudes outwardly from a front surface 7b of the second pillar 7, which is one of two surfaces of the second pillar 7 in the element-thickness direction. The second boss 12 of each element 3 is configured to be loosely engaged with the second dimple 13 of the adjacent element 3 when the elements 3 and the hoop 2 have been assembled together.

The second dimple 13 is provided at the upper end portion 7a of the second pillar 7. Specifically, the second dimple 13 is recessed inwardly from a rear surface 7c of the second pillar 7, which is the other one of the two surfaces of the second pillar 7 in the element-thickness direction. The second dimple 13 of each element 3 is configured such that the second boss 12 of the adjacent element 3 is loosely engaged with the second dimple 13 of the element 3 when the elements 3 and the hoop 2 have been assembled together. Thus, in the drive belt 1, the second boss 12 of each element 3 is engaged with the second dimple 13 of the adjacent element 3 in the circumferential direction.

When the first bosses 10 are engaged with the first dimples 11 and the second bosses 12 are engaged with the second dimples 13 as described above, the relative positions of the elements 3 adjacent to each other are determined and relative displacement between the elements 3 adjacent to each other is restricted. Thus, the state in which the elements 3 are arrayed in a loop, and the orientation of the elements 3 in this arrayed state are maintained.

The multiple elements 3 are arrayed in a uniform orientation and joined together in a loop by the hoop 2, so that the drive belt 1 is formed. Then, the drive belt 1 is looped over the pulleys P1, P2. Thus, when the drive belt 1 have been looped over the pulleys P1, P2, the multiple elements 3 need to be arranged in a radial manner about the centers of the pulleys P1, P2 and need to be in contact with each other. For this reason, a lower part of the base portion 4 in the element-height direction is thinner than the remaining part of the base portion 4. Specifically, a locking edge 16 is provided in a front surface 4f, at a predetermined position that is below the saddle surface 5. The front surface 4f is one of two surfaces of the base portion 4 in the element-thickness direction. In the base portion 4, the plate-thickness of a part below the locking edge 16 is less than the plate-thickness of a part above the locking edge 16. With this configuration, when the drive belt 1 have been looped over the pulleys P1, P2 and the multiple elements 3 are arranged in a radial manner, the locking edge 16 of each element 3 is in contact with a rear surface 4g of the adjacent element 3. The rear surface 4g is the other one of the two surfaces of the base portion 4 in the element-thickness direction.

Figure 5:
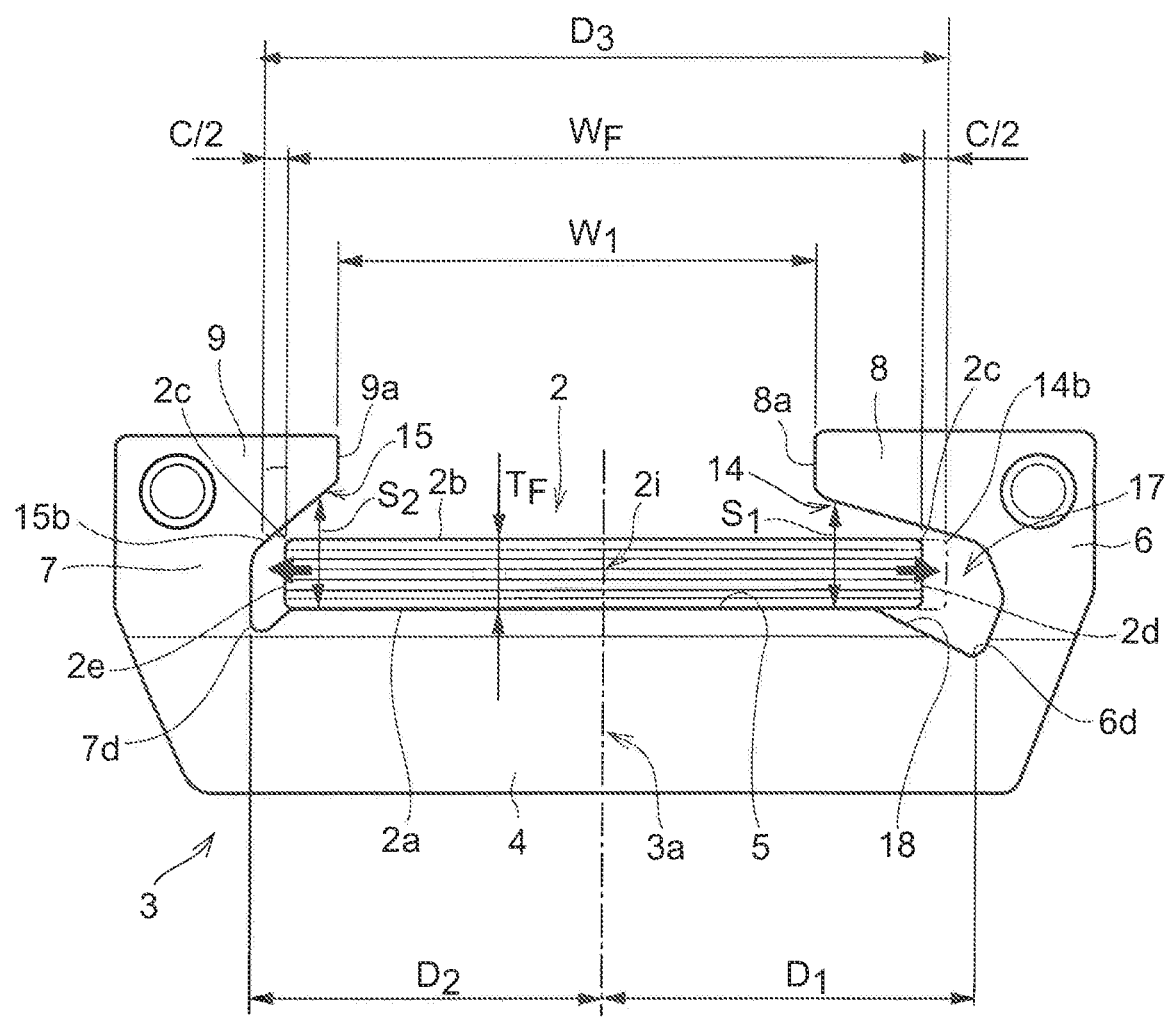
FIG. 5 is a view illustrating the configuration of the drive belt, FIG. 5 illustrating the dimensions, positional relationships and so forth of various portions of each element and various portions of the hoop.

As illustrated in FIG. 2 and FIG. 5, each element 3 is configured such that a first opening width $W_1$, which is a distance between a distal end 8a of the first hook 8 and a distal end 9a of the second hook 9, is less than a width $W_F$ of the hoop 2. The distal end 8a and the distal end 9a face each other in the element-width direction. The first opening width $W_1$ is the shortest distance between the distal end 8a and the distal end 9a in the element-width direction. The width $W_F$ is a distance between the two side surfaces 2d, 2e of the hoop 2 in the hoop-width direction. Because the first opening width $W_1$ of the element 3 is less than the width $W_F$ of the hoop 2, the element 3 is prevented from being detached from the hoop 2 when the elements 3 and the hoop 2 have been assembled together, as described later.

As illustrated in FIG. 2 and FIG. 5, each element 3 is configured such that a first dimension $D_1$, which is a distance from the center portion 3a to a root portion 6d of the first pillar 6 in the element-width direction, is greater than a second dimension $D_2$, which is a distance from the center portion 3a to a root portion 7d of the second pillar 7 in the element-width direction. The root portion 6d is a portion at which an inner wall surface 6e of the first pillar 6 is connected to the base portion 4. The root portion 7d is a portion at which an inner wall surface 7e of the second pillar 7 is connected to the base portion 4. The inner wall surface 6e and the inner wall surface 7e face each other in the element-width direction. Each of the inner wall surface 6e and the inner wall surface 7e may be a single flat surface or a single curved surface. Alternatively, each of the inner wall surface 6e and the inner wall surface 7e may be a combination of a plurality of flat surfaces or a combination of a plurality of curved surfaces. In the example illustrated in FIG. 2 and FIG. 5, the inner wall surface 6e is a combination of two flat surfaces having different inclinations, and the inner wall surface 7e is a single flat surface.

Thus, each element 3 is configured such that the shape of the saddle surface 5 on which the hoop 2 is disposed is bilaterally asymmetrical in the element-width direction. Further, the shape of the root portion 6d and its surrounding region and the shape of the root portion 7d and its surrounding region are bilaterally asymmetrical in the element-width direction. Specifically, a space defined by the first hook 8, the first pillar 6, the root portion 6d and its surrounding region, and an end portion 5a of the saddle surface 5 is larger than a space defined by the second hook 9, the second pillar 7, the root portion 7d and its surrounding region, and an end portion 5b of the saddle surface 5. The end portion Sa of the saddle surface 5 is close to the first pillar 6, and the end portion 5b of the saddle surface 5 is close to the second pillar 7. The large space provided adjacent to the root portion 6d of the first pillar 6 is used as an assembly space 17 into which one end portion of the hoop 2 is inserted at the initial stage of a course of assembling the element 3 and the hoop 2 together.

Specifically, the assembly space 17 is a space defined by a first inclined surface 14a (described later), the inner wall surface 6e of the first pillar 6 that faces the second pillar 7, and a guide surface 18. As will be described later, the first inclined surface 14a is a surface (i.e., a lower surface 8b) of the first hook 8, which faces the saddle surface 5. The first inclined surface 14a is inclined at a predetermined inclination with respect to the saddle surface 5. The guide surface 18 extends from the end portion 5a of the saddle surface 5. The guide surface 18 is a flat surface that is inclined with respect to the saddle surface 5 or is a curved surface that is inclined with respect to the saddle surface 5. The guide surface 18 is inclined with respect to the saddle surface 5 in the same direction as the direction in which the first inclined surface 14a is inclined with respect to the saddle surface 5. Thus, in the course of inserting one end portion of the hoop 2 into the assembly space 17, the inner peripheral surface 2a of the one end portion of the hoop 2 is guided along the guide surface 18 that defines a part of the assembly space 17. Specifically, the hoop 2 is positioned so as to be inclined with respect to the element 3, and then the one end portion of the hoop 2 is inserted into the assembly space 17 through an opening defined between the first hook 8 and the second hook 9 of the element 3. Therefore, even when the first opening width $W_1$, which is the distance between the first hook 8 and the second hook 9, is less than the width $W_F$ of the hoop 2 as described above, the hoop 2 can be passed through the opening defined between the first hook 8 and the second hook 9 to be assembled to the element 3.

Figure 6:
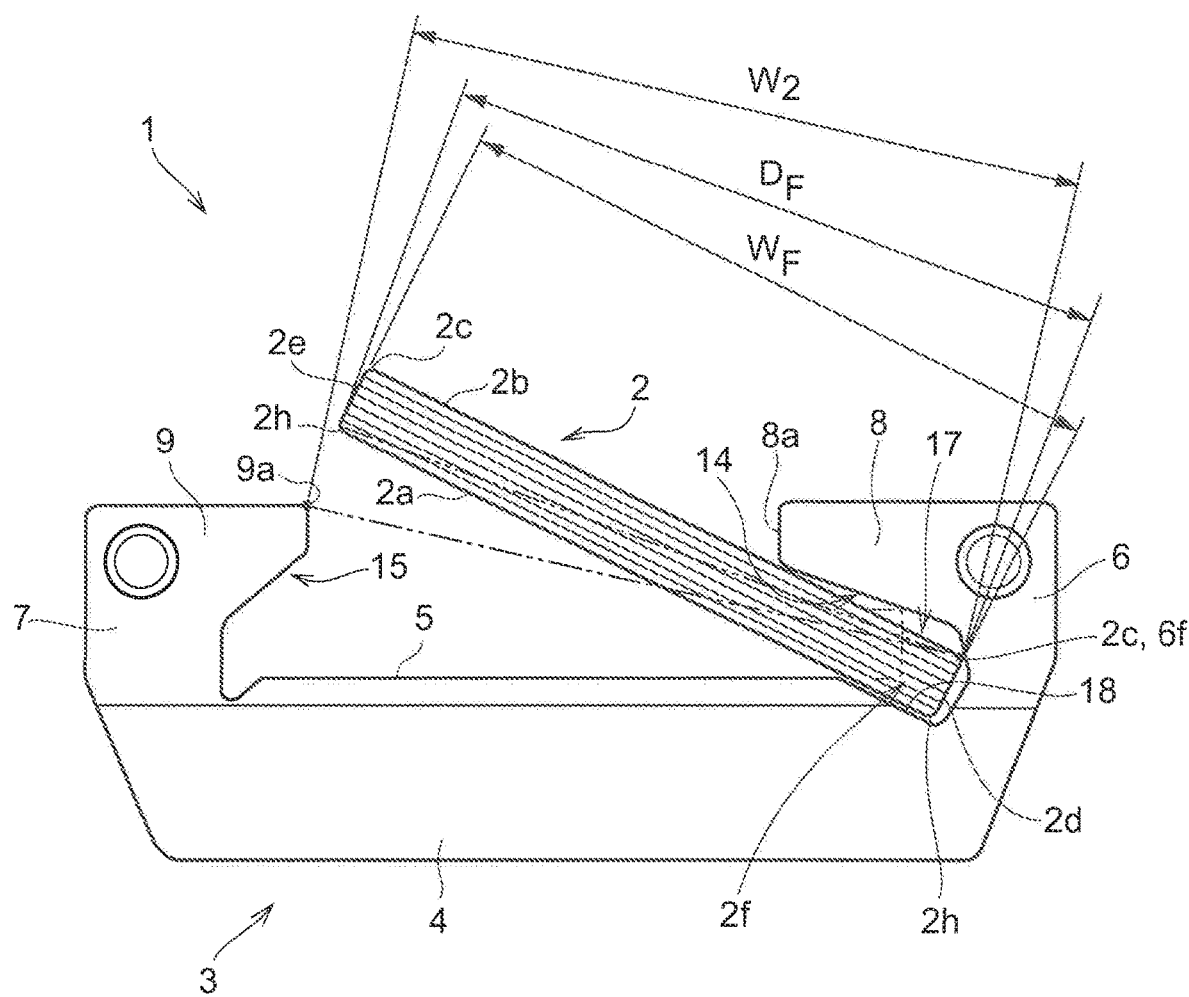
FIG. 6 is a view illustrating the manner of assembling the drive belt, FIG. 6 illustrating how one end portion of the hoop is fitted into an assembly space of each element at the initial stage of the assembly, and illustrating the dimensions, positional relationships and so forth of various portions of the element and various portions of the hoop at the initial stage of the assembly.

In the course of forming the drive belt 1 according to the present embodiment of the disclosure, the hoop 2 is assembled to the element 3 by using the assembly space 17 provided in the element 3. Specifically, as illustrated in FIG. 6, at the initial stage of assembly, an end portion 2f (or an end portion 2g) of the hoop 2, which is one end portion of the hoop 2 in the hoop-width direction, is temporarily inserted obliquely into the assembly space 17 of the element 3. Alternatively, the element 3 is positioned so as to be inclined with respect to the hoop 2, and the element 3 is moved such that the end portion 2f (or the end portion 2g)

of the hoop 2 is fitted into the assembly space 17 of the element 3. In the example illustrated in FIG. 6, the end portion 2f of the hoop 2 is fitted in the assembly space 17 of the element 3.

As illustrated in FIG. 2 and FIG. 6, each element 3 is configured such that a second opening width $W_2$, which is a distance between the inner wall surface 6e of the first pillar 6 and the distal end 9a of the second hook 9, is greater than the width $W_F$ of the hoop 2. Specifically, the second opening width $W_2$ is a distance between the distal end 9a and a contact site 6f at which the hoop 2 comes into contact with the inner wall surface 6e of the first pillar 6. The contact site 6f is a site at which the side surface 2d or the edge 2c of the hoop 2 comes into contact with the first pillar 6, which partially defines the assembly space 17, when the end portion 2f of the hoop 2 is inserted into the assembly space 17 and brought into contact with the first pillar 6. That is, the contact site 6f is a site at which the side surface 2d or the edge 2c of the hoop 2 comes into contact with the inner wall surface 6e of the first pillar 6 when the end portion 2f of the hoop 2 is inserted into the assembly space 17 and brought into contact with the first pillar 6.

Figure 7:
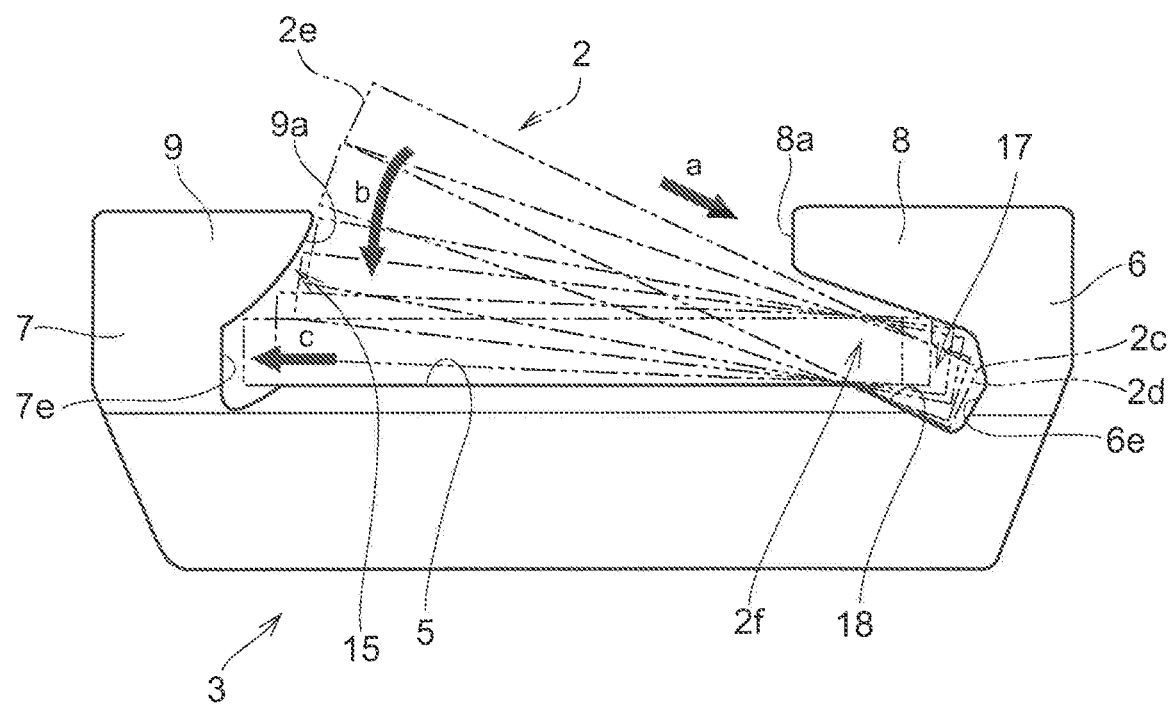
FIG. 7 is a view illustrating the manner of assembling the drive belt, FIG. 7 illustrating how the hoop is caused to pivot about its one end portion fitted in the assembly space to be disposed onto a saddle surface of the element.

For example, as illustrated in FIG. 7, in the course of assembling the element 3 and the hoop 2 together (hereinafter, referred to as "during assembly of the element 3 and the hoop 2" where appropriate), the end portion 2f of the hoop 2 is inserted into the assembly space 17 (in a direction indicated by an arrow a) such that the side surface 2d or the edge 2c of the hoop 2 comes into contact with the inner wall surface 6e of the first pillar 6. Then, the hoop 2 of which the end portion 2f has been inserted into the assembly space 17 is caused to pivot (in a direction indicated by an arrow b) about a predetermined portion near the side surface 2d such that the side surface 2e approaches the distal end 9a. Then, the hoop 2 is caused to further pivot such that the side surface 2e passes by the distal end 9a, and the hoop 2 of which the end portion 2f has come out of the assembly space 17 is disposed onto the saddle surface 5 of the element 3 (in a direction indicated by an arrow c). Alternatively, by moving the element 3 with respect to the hoop 2, the end portion 2f of the hoop 2 is inserted into the assembly space 17 such that the inner wall surface 6e of the first pillar 6 comes into contact with the side surface 2d or the edge 2c of the hoop 2. Then, the element 3 with the end portion 2f of the hoop 2 inserted in the assembly space 17 is caused to pivot about a predetermined position inside the assembly space 17 such that the distal end 9a approaches the side surface 2e. Then, the element 3 is caused to further pivot such that the distal end 9a passes by the side surface 2e, and the hoop 2 of which the end portion 2f has come out of the assembly space 17 is disposed onto the saddle surface 5 of the element 3. The second opening width $W_2$ is the shortest distance between the distal end 9a and a site at which the side surface 2d or the edge 2c of the hoop 2 comes into contact with the inner wall surface 6e. The second opening width $W_2$ is the shortest distance between the distal end 9a and the above-described site, which can be achieved when the side surface 2e passes by the distal end 9a or when the distal end 9a passes by the side surface 2e in the course of assembling the element 3 and the hoop 2 together in the foregoing manner. Therefore, when each element 3 is configured such that the second opening width $W_2$ is greater than the width $W_F$ of the hoop 2, the element 3 and the hoop 2 can be easily assembled together.

In an example illustrated in FIG. 7, the first displacement-restriction surface 14 (i.e., the first inclined surface 14a) of the first hook 8 of each element 3 is a flat inclined surface.

On the other hand, as in examples to be described later, the second displacement-restriction surface 15 (i.e., the second inclined surface 15a) of the second hook 9 of each element 3 is a curved inclined surface that is curved so as to define an outwardly-bulging portion of the second hook 9. Each element 3 of the drive belt 1 according to the present embodiment of the disclosure may be configured such that at least one of the first inclined surface and the second inclined surface is a curved surface or a flat surface that is inclined at a predetermined inclination with respect to the saddle surface 5. Alternatively, each element 3 may be configured such that at least one of the first inclined surface and the second inclined surface is a combination of a plurality of flat surfaces having different inclinations with respect to the saddle surface 5.

As illustrated in FIG. 2 and FIG. 6, in the drive belt 1 according to the present embodiment of the disclosure, the second opening width $W_2$ is greater than the width $W_F$ of the hoop 2, and the second opening width $W_2$ may be greater than a diagonal distance $D_F$ of the hoop 2. The diagonal distance $D_F$ is a distance between one of the two edges 2c of the outer peripheral surface 2b of the hoop 2 and one of two edges 2h of the inner peripheral surface 2a of the hoop 2, which is located diagonally to the one of the two edges 2c. Thus, the diagonal distance $D_F$ is greater than the width $W_F$ of the hoop 2. The two edges 2h are two ends of the inner peripheral surface 2a of the hoop 2 in the hoop-width direction. The two edges 2h are corner portions where the side surface 2d and the side surface 2e, which are the two side surfaces of the hoop 2 in the hoop-width direction, meet the inner peripheral surface 2a. As illustrated in FIG. 2 and FIG. 6, the diagonal distance $D_F$ is the maximum value of the width of the hoop 2 in the element-width direction, which can be achieved when the hoop 2 is inclined at a predetermined angle with respect to the saddle surface 5 during assembly of the element 3 and the hoop 2. Thus, when each element 3 is configured such that the second opening width $W_2$ is greater than the diagonal distance $D_F$, the element 3 and the hoop 2 can be reliably and easily assembled together.

Note that the second opening width $W_2$ need not be greater than the diagonal distance $D_F$ of the hoop 2. For example, if each element 3 is configured such that the second opening width $W_2$ is less than the width $W_F$ of the hoop 2, the hoop 2 can be deformed (deflected or warped) such that the two end portions of the hoop 2 in the hoop-width direction approach each other because the hoop 2 includes flexible band-shaped members, such as steel bands, as described above. By deforming the hoop 2 in this way, the width WE of the hoop 2 can be temporarily made less than the second opening width $W_2$. Thus, even if the second opening width $W_2$ is less than the width $W_F$ of the hoop 2, the element 3 and the hoop 2 can be assembled together. However, in this case, the hoop 2 needs to be deformed.

In contrast to this, in the drive belt 1 according to the present embodiment of the disclosure, the second opening width $W_2$ is greater than the width $W_F$ of the hoop 2 or the diagonal distance $D_F$ as described above, so that the hoop 2 can be easily disposed onto the saddle surface 5 of the element 3 without being deformed. That is, the element 3 and the hoop 2 can be easily assembled together. Because the hoop 2 need not be deformed, a force applied to the hoop 2 during assembly can be reduced. This improves the durability and reliability of the hoop 2.

As described above, in the drive belt 1 according to the present embodiment of the disclosure, in the course of assembling the element 3 and the hoop 2 together, the end portion 2f (or the end portion 2g), which is one end portion of the hoop 2 in the hoop-width direction, is temporarily inserted into the assembly space 17 of the element 3. Then, the hoop 2 is passed through the opening of the element 3, that is, the space between the first hook 8 and the second hook 9. Then, the end portion 2f (or the end portion 2g) of the hoop 2 is pulled out of the assembly space 17, and the hoop 2 is moved in the element-width direction and disposed at a prescribed position, or a position close to the prescribed position, on the saddle surface 5 of the element 3. Thus, the element 3 and the hoop 2 are assembled together. As illustrated in FIG. 2 and FIG. 5, the prescribed position in this case is a position at which a center portion 2i of the hoop 2 in the hoop-width direction and the center portion 3a of the element 3 coincide with each other. After the hoop 2 is disposed at the prescribed position, or a position close to the prescribed position, on the saddle surface 5 of the element 3, that is, when the element 3 and the hoop 2 have been assembled together, the element 3 can be prevented from being detached from the hoop 2 because the first opening width $W_1$ of the element 3 is less than the width $W_F$ of the hoop 2 as described above.

A crown (not illustrated) protruding upward in the element-height direction at the center portion 3a may be provided on the saddle surface 5 of the element 3. When such a crown or a crown-shaped portion is provided on the saddle surface 5, the center portion of the hoop 2 can be aligned with the center portion of the element 3 in the element-width direction during an operation of the drive belt 1. Therefore, the hoop 2 can be always disposed at the prescribed position or a position close to the prescribed position.

As described above, in the drive belt 1, the assembly space 17 is provided in the element 3 so as to be adjacent to the first hook 8. This allows the element 3 and the hoop 2 to be easily assembled together. Further, the second opening width $W_2$ of the element 3 is greater than the width $W_F$ of the hoop 2 or the diagonal distance $D_F$ of the hoop 2. Therefore, when the first and second bosses 10, 12 of each element 3 are disengaged from the first and second dimples 1l, 13 of the adjacent element 3, for example, due to aging deterioration of the drive belt 1, if the element 3 and the hoop 2 are displaced relative to each other in the element-width direction, the end portion 2f of the hoop 2 may enter the assembly space 17 again. As a result, the element 3 may be detached from the hoop 2 under its own weight.

In view of this, in each element 3 of the drive belt 1 according to the present embodiment of the disclosure, the first hook 8 includes the first displacement-restriction surface 14 and the second hook 9 includes the second displacement-restriction surface 15, as described above. Each of the first displacement-restriction surface 14 and the second displacement-restriction surface 15 is an inclined surface that comes into contact with one of the two edges 2c of the outer peripheral surface 2b of the hoop 2 when the element 3 and the hoop 2 disposed on the saddle surface 5 are displaced relative to each other in the element-width direction. Thus, when the hoop 2 is disposed at the prescribed position, or a position close to the prescribed position, on the saddle surface 5, relative displacement between the hoop 2 and the element 3 in the element-width direction is restricted by the first displacement-restriction surface 14 and the second displacement-restriction surface 15.

Specifically, as illustrated in FIG. 2 and FIG. 5, the first displacement-restriction surface 14 is provided in the lower surface 8b of the first hook 8. The lower surface 8b is the surface of the first hook 8, which faces the saddle surface 5.

When the element 3 and the hoop 2 have been assembled together, the lower surface 8b faces the outer peripheral surface 2b of the hoop 2 and prevents the element 3 from being detached from the hoop 2. The first displacement-restriction surface 14 is configured such that a distance (i.e., a clearance) $S_1$ between the first displacement-restriction surface 14 and a predetermined virtual plane that includes the saddle surface 5 and that is flush with the saddle surface 5 (hereinafter, referred to as "the predetermined virtual plane that is flush with the saddle surface 5") is greater than a thickness $T_F$ of the hoop 2 at a position close to the center portion 3a of the saddle surface 5 and is less than the thickness $T_F$ at a position apart from the hoop 2 in a direction toward the first pillar 6 along the element-width direction. That is, the first displacement-restriction surface 14 is the first inclined surface 14a that is inclined with respect to the saddle surface 5 such that the distance $S_1$ between the first inclined surface 14a and the predetermined virtual plane that is flush with the saddle surface 5 increases in a direction from a portion of the first hook 8, which is close to the first pillar 6, toward the distal end 8a of the first hook 8. In the example illustrated in FIG. 2 and FIG. 5, the first inclined surface 14a is a flat surface that is inclined at a predetermined inclination with respect to the saddle surface 5. The distance $S_1$ is a distance between the first displacement-restriction surface 14, that is, the first inclined surface 14a, and the predetermined virtual plane that is flush with the saddle surface 5. Because the first displacement-restriction surface 14 is the first inclined surface 14a inclined with respect to the saddle surface 5 as described above, the distance $S_1$ varies depending on a position in the element-width direction. The thickness $T_F$ is the longest distance between the inner peripheral surface 2a and the outer peripheral surface 2b of the hoop 2 in the plate-thickness direction of the hoop 2.

Similarly, the second displacement-restriction surface 15 is provided in the lower surface 9b of the second hook 9. The lower surface 9b is the surface of the second hook 9, which faces the saddle surface 5. When the element 3 and the hoop 2 have been assembled together, the lower surface 9b faces the outer peripheral surface 2b of the hoop 2 and prevents the element 3 from being detached from the hoop 2. The second displacement-restriction surface 15 is configured such that a distance (i.e., a clearance) $S_2$ between the second displacement-restriction surface 15 and the predetermined virtual plane that is flush with the saddle surface 5 is greater than the thickness $T_F$ of the hoop 2 at a position close to the center portion 3a of the saddle surface 5 and is less than the thickness $T_F$ at a position apart from the hoop 2 in a direction toward the second pillar 7 along the element-width direction. That is, the second displacement-restriction surface 15 is the second inclined surface 15a that is inclined with respect to the saddle surface 5 such that the distance $S_2$ between the second inclined surface 15a and the predetermined virtual plane that is flush with the saddle surface 5 increases in a direction from a portion of the second hook 9, which is close to the second pillar 7, toward the distal end 9a of the second hook 9. In the example illustrated in FIG. 2 and FIG. 5, the second inclined surface 15a is a flat surface inclined at a predetermined inclination with respect to the saddle surface 5. The distance $S_2$ is a distance between the second displacement-restriction surface 15, that is, the second inclined surface 15a, and the predetermined virtual plane that is flush with the saddle surface 5. Because the second displacement-restriction surface 15 is the second inclined surface 15a inclined with respect to the saddle surface 5 as described above, the distance $S_2$ as well as the distance $S_1$ varies depending on a position in the element-width direction. As in examples to be described later, each of the first inclined surface 14a and the second inclined surface 15a may be a curved surface inclined with respect to the saddle surface 5 or a combination of a plurality of flat surfaces inclined with respect to the saddle surface 5.

The first displacement-restriction surface 14 is the first inclined surface 14a configured such that the distance $S_1$ between the first inclined surface 14a and the predetermined virtual plane that is flush with the saddle surface 5 is greater than the thickness $T_F$ at a position close to the center portion 3a of the saddle surface 5 and is less than the thickness $T_F$ at a position apart from the hoop 2 in a direction toward the first pillar 6. The second displacement-restriction surface 15 is the second inclined surface 15a configured such that the distance $S_2$ between the second inclined surface 15a and the predetermined virtual plane that is flush with the saddle surface 5 is greater than the thickness $T_F$ at a position close to the center portion 3a of the saddle surface 5 and is less than the thickness $T_F$ at a position apart from the hoop 2 in a direction toward the second pillar 7. Thus, as illustrated in FIG. 2 and FIG. 5, when the element 3 and the hoop 2 have been assembled together and the hoop 2 is disposed at the prescribed position, or a position close to the prescribed position, on the saddle surface 5, if the element 3 and the hoop 2 are displaced relative to each other in the element-width direction, one of the two edges 2c of the hoop 2 comes into contact with a site on one of the first inclined surface 14a and the second inclined surface 15a. In FIG. 5, a site at which the first inclined surface 14a and the edge 2c come into contact with each other when the hoop 2 is displaced relative to the element 3 in a direction toward the first pillar 6 (i.e., rightward in FIG. 5) is indicated as a first contact site 14b. Similarly, a site at which the second inclined surface 15a and the edge 2c come into contact with each other when the hoop 2 is displaced relative to the element 3 in a direction toward the second pillar 7 (i.e., leftward in FIG. 5) is indicated as a second contact site 15b.

Each element 3 is configured such that the distance between the first contact site 14b and the second contact site 15b (hereinafter referred to as "third dimension $D_3$") is greater than the width $W_F$ of the hoop 2. That is, the shapes, dimensions, inclination angles and so forth of the first inclined surface 14a and the second inclined surface 15a are set such that the third dimension $D_3$ is greater than the width $W_F$. As illustrated in FIG. 2 and FIG. 5, the third dimension $D_3$ is set to a value obtained by adding a predetermined clearance C to the width $W_F$. The predetermined clearance C is set to such a value that the third dimension $D_3$ is slightly greater than the width $W_F$. The value of the predetermined clearance C is set such that the first inclined surface 14a and the second inclined surface 15a do not restrict displacement of the hoop 2 in a normal state (a state where the hoop 2 is disposed at the prescribed position, or a position close to the prescribed position, on the saddle surface 5 of the element 3). As described above, when the element 3 and the hoop 2 disposed at the prescribed position, or a position close to the prescribed position, on the saddle surface 5 are displaced relative to each other in the element-width direction, the first inclined surface 14a and the second inclined surface 15a restrict the relative displacement. That is, the first inclined surface 14a and the second inclined surface 15a prevent the element 3 and the hoop 2 from being displaced relative to each other in the element-width direction by a distance equal to or greater than the predetermined clearance C.

Because the distance between the first hook 8 and the second hook 9, that is, the first opening width $W_1$, is less than the width $W_F$ of the hoop 2, each element 3 includes the surfaces respectively facing the two side surfaces 2d, 2e of the hoop 2. Specifically, the surfaces of the element 3 respectively facing the two side surfaces 2d, 2e of the hoop 2 are the first inclined surface 14a and the second inclined surface 15a. In the normal state where the element 3 and the hoop 2 have been assembled together, the first inclined surface 14a and the second inclined surface 15a respectively face the two edges 2c of the hoop 2 without coming into contact with the edges 2c. The distance St between the first inclined surface 14a and the predetermined virtual plane that is flush with the saddle surface 5 and the distance $S_2$ between the second inclined surface 15a and the predetermined virtual plane that is flush with the saddle surface 5 are each greater than the thickness $T_F$ of the hoop 2 at a position close to the center portion 3a of the saddle surface 5 and is less than the thickness $T_F$ of the hoop 2 at a position apart from the hoop 2 in the element-width direction.

In the example illustrated in FIG. 2 and FIG. 5, when the element 3 attempts to be displaced relative to the hoop 2 in the downward direction in FIG. 2 and FIG. 5, the hoop 2 is caught on the first hook 8 and the second hook 9 because the first opening width $W_1$ is less than the width $W_F$ of the hoop 2. Because the first hook 8 and the second hook 9 are provided, the element 3 can be prevented from being detached from the hoop 2. The first inclined surface 14a and the second inclined surface 15a respectively face the two edges 2c of the hoop 2 in the up-down direction and also in the lateral direction (i.e., the element-width direction) in FIG. 2 and FIG. 5. Therefore, when the element 3 and the hoop 2 attempt to be displaced relative to each other in the element-width direction, one of the two edges 2c of the hoop 2 comes into contact with one of the first inclined surface 14a and the second inclined surface 15a, so that the relative displacement between the element 3 and the hoop 2 in the element-width direction is restricted. Thus, a significant relative displacement in the element-width direction, which causes the end portion 2f (or the end portion 2g) of the hoop 2 to be disengaged from the first hook 8 (or the second hook 9), does not occur. It is therefore possible to more reliably prevent the element 3 from being detached from the hoop 2.

The drive belt 1 according to the present embodiment of the disclosure is not limited to the foregoing example. The drive belt 1 according to the present embodiment of the disclosure may include elements 20 illustrated in FIG. 8, elements 30 illustrated in FIG. 9, elements 40 illustrated in FIG. 10, elements 50 illustrated in FIG. 11, elements 60 illustrated in FIG. 12, or elements 70 illustrated in FIG. 13. In the element 20 illustrated in FIG. 8, the element 30 illustrated in FIG. 9, the element 40 illustrated in FIG. 10, the element 50 illustrated in FIG. 11, the element 60 illustrated in FIG. 12, and the element 70 illustrated in FIG. 13, the components, portions and so forth that have the same configurations or functions as those of the element 3 illustrated in FIG. 2 and FIG. 3 are denoted by the same reference signs as those in FIG. 2 and FIG. 3.

Figure 8:
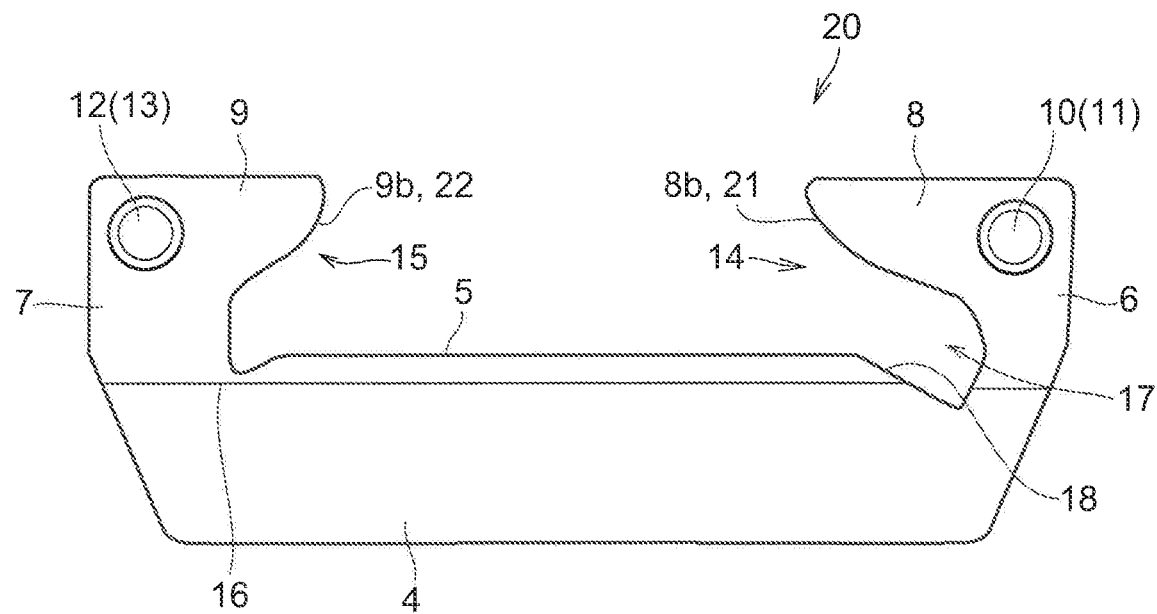
FIG. 8 is a view illustrating another example of the drive belt, FIG. 8 illustrating the configuration in which a first inclined surface of a first hook, which is a first displacement-restriction surface, is a curved surface that defines an outwardly-bulging portion of the first hook, and a second inclined surface of a second hook, which is a second displacement-restriction surface, is a curved surface that defines an outwardly-bulging portion of the second hook.

The element 20 illustrated in FIG. 8 includes a first inclined surface 21 as the first displacement-restriction surface 14 of the first hook 8, and a second inclined surface 22 as the second displacement-restriction surface 15 of the second hook 9. The first inclined surface 21 is a curved surface that is inclined with respect to the saddle surface 5 and that is curved so as to define an outwardly-bulging portion of the first hook 8 (i.e., that is curved so as to bulge toward the outside of the first hook 8). The second inclined surface 22 is a curved surface that is inclined with respect to the saddle surface 5 and that is curved so as to define an outwardly-bulging portion of the second hook 9.

Figure 9:
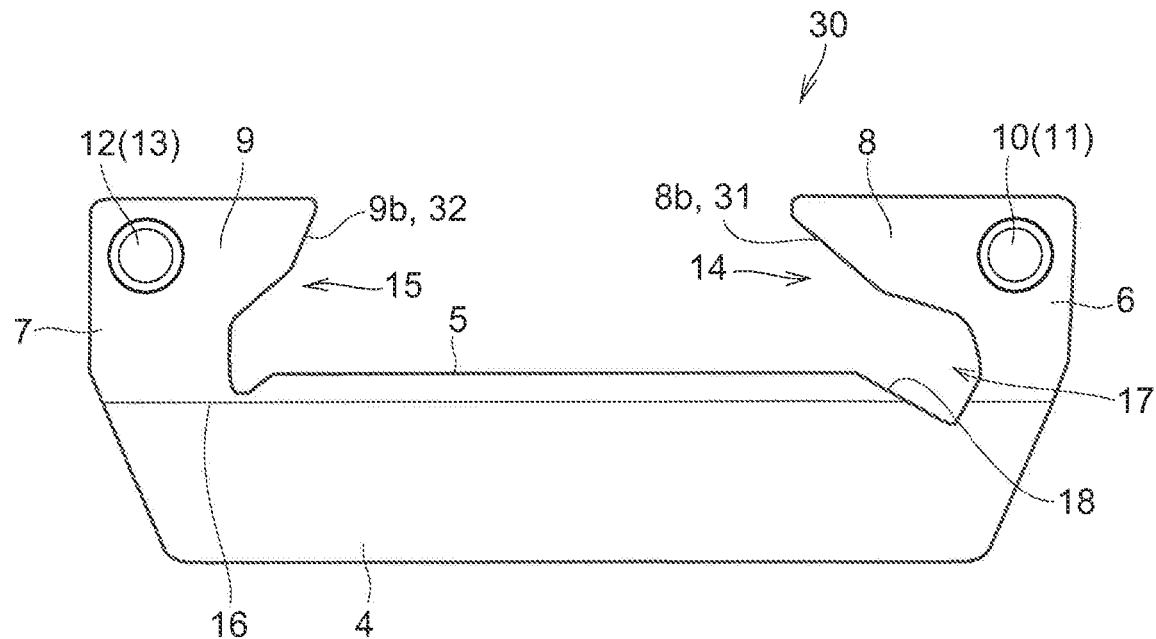
FIG. 9 is a view illustrating another example of the drive belt, FIG. 9 illustrating the configuration in which the first inclined surface of the first hook, which is the first displacement-restriction surface, is a combination of a plurality of flat surfaces that are connected to each other with an angle formed therebetween so as to define an outwardly-bulging portion of the first hook, and the second inclined surface of the second hook, which is the second displacement-restriction surface, is a combination of a plurality of flat surfaces that are connected to each other with an angle formed therebetween so as to define an outwardly-bulging portion of the second hook.

The element 30 illustrated in FIG. 9 includes a first inclined surface 31 as the first displacement-restriction surface 14 of the first hook 8, and a second inclined surface 32 as the second displacement-restriction surface 15 of the second hook 9. The first inclined surface 31 is a combination of a plurality of flat surfaces that are inclined with respect to the saddle surface 5 and that are connected to each other with an angle formed therebetween so as to define an outwardly-bulging portion of the first hook 8. The second inclined surface 32 is a combination of a plurality of flat surfaces that are inclined with respect to the saddle surface 5 and that are connected to each other with an angle formed therebetween so as to define an outwardly-bulging portion of the second hook 9. In the example illustrated in FIG. 9, each of the first inclined surface 31 and the second inclined surface 32 is a combination of two flat surfaces.

In the examples illustrated in FIG. 8 and FIG. 9, the first displacement-restriction surface 14 of each of the element 20 and the element 30 is the inclined surface that defines the outwardly-bulging portion of the first hook 8. The second displacement-restriction surface 15 of each of the element 20 and the element 30 is the inclined surface that defines the outwardly-bulging portion of the second hook 9. Both the first displacement-restriction surface 14 of the first hook 8 and the second displacement-restriction surface 15 of the second hook 9 are the inclined surfaces that respectively define the outwardly-bulging portions of the first and second hooks 8, 9. Therefore, near the opening, the distance between the first hook 8 and the second hook 9 can be increased. Thus, the elements 20 or the elements 30 can be easily assembled to the hoop 2.

As described above, both the first displacement-restriction surface 14 of the first hook 8 and the second displacement-restriction surface 15 of the second hook 9 are the inclined surfaces that respectively define the outwardly-bulging portions of the first and second hooks 8, 9. Therefore, the distances $S_1$, $S_2$ (i.e., the distance between the first displacement-restriction surface 14 and the predetermined virtual plane that is flush with the saddle surface 5, and the distance between the second displacement-restriction surface 15 and the predetermined virtual plane that is flush with the saddle surface 5) can be increased, at portions near the root portions of the first and second hooks 8, 9 (i.e., a portion at which the first hook 8 is connected to the first pillar 6, and a portion at which the second hook 9 is connected to the second pillar 7). Thus, relative displacement between the elements 20, 30 and the hoop 2 in the element-width direction can be moderately restricted by the first and second displacement-restriction surfaces 14, 15. As a result, an impact to be generated when the hoop 2 comes into contact with the first displacement-restriction surface 14 or the second displacement-restriction surface 15 can be reduced. As a result, the durability and reliability of the drive belt 1 can be improved.

Figure 10:
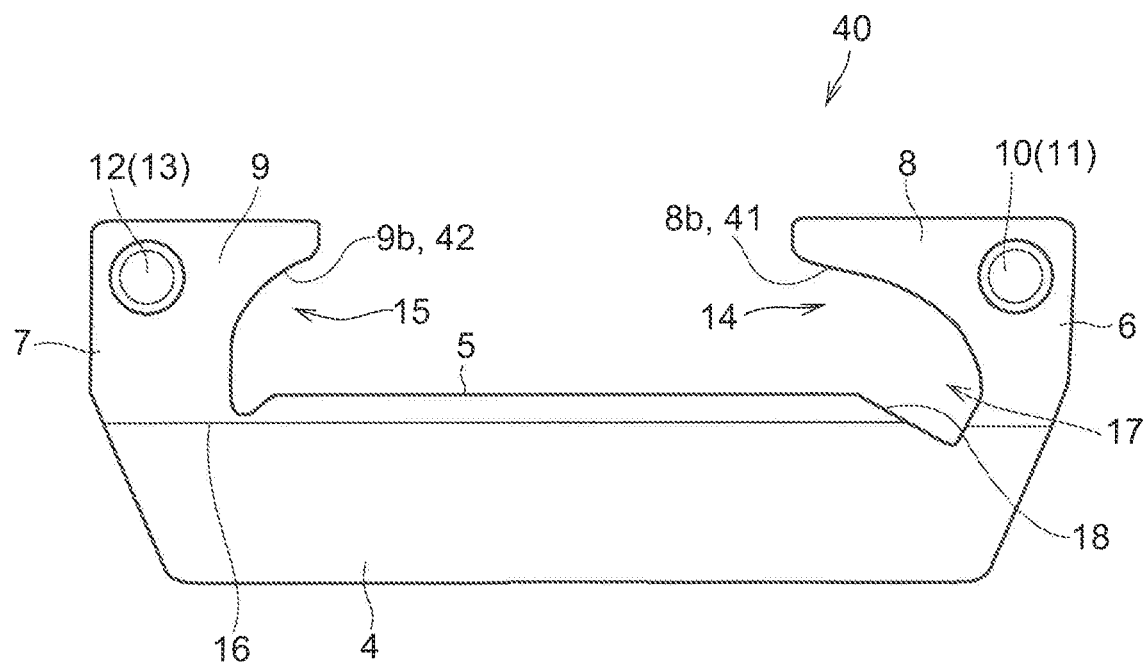
FIG. 10 is a view illustrating another example of the drive belt, FIG. 10 illustrating the configuration in which the first inclined surface of the first hook, which is the first displacement-restriction surface, is a curved surface that defines an inwardly-recessed portion of the first hook, and the second inclined surface of the second hook, which is the second displacement-restriction surface, is a curved surface that defines an inwardly-recessed portion of the second hook.

The element 40 illustrated in FIG. 10 includes a first inclined surface 41 as the first displacement-restriction surface 14 of the first hook 8, and a second inclined surface 42 as the second displacement-restriction surface 15 of the second hook 9. The first inclined surface 41 is a curved surface that is inclined with respect to the saddle surface 5 and that is curved so as to define an inwardly-recessed portion of the first hook 8 (i.e., that is curved so as to be recessed toward the inside of the first hook 8). The second inclined surface 42 is a curved surface that is inclined with respect to the saddle surface 5 and that is curved so as to define an inwardly-recessed portion of the second hook 9.

Figure 11:
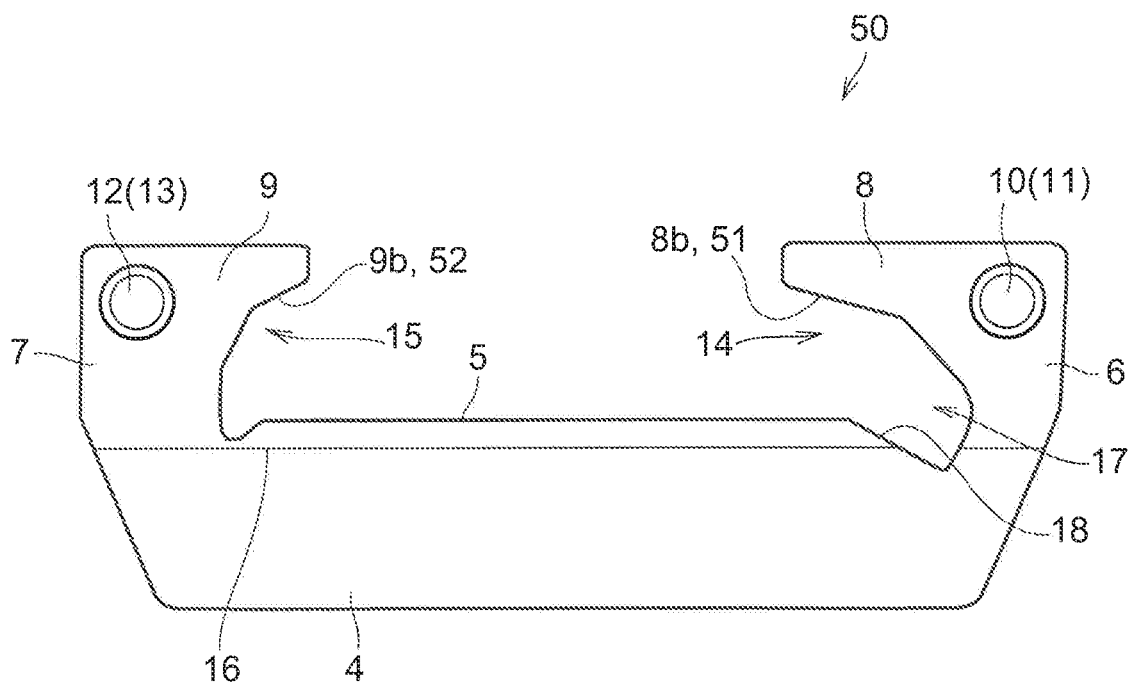
FIG. 11 is a view illustrating another example of the drive belt, FIG. 11 illustrating the configuration in which the first inclined surface of the first hook, which is the first displacement-restriction surface, is a combination of a plurality of flat surfaces that are connected to each other with an angle formed therebetween so as to define an inwardly-recessed portion of the first hook, and the second inclined surface of the second hook, which is the second displacement-restriction surface, is a combination of a plurality of flat surfaces that are connected to each other with an angle formed therebetween so as to define an inwardly-recessed portion of the second hook.

The element 50 illustrated in FIG. 11 includes a first inclined surface 51 as the first displacement-restriction surface 14 of the first hook 8, and a second inclined surface 52 as the second displacement-restriction surface 15 of the second hook 9. The first inclined surface 51 is a combination of a plurality of flat surfaces that are inclined with respect to the saddle surface 5 and that are connected to each other with an angle formed therebetween so as to define an inwardly-recessed portion of the first hook 8. The second inclined surface 52 is a combination of a plurality of flat surfaces that are inclined with respect to the saddle surface 5 and that are connected to each other with an angle formed therebetween so as to define an inwardly-recessed portion of the second hook 9. In the example illustrated in FIG. 11, each of the first inclined surface 51 and the second inclined surface 52 is a combination of two flat surfaces.

In the examples illustrated in FIG. 10 and FIG. 11, the first displacement-restriction surface 14 of each of the element 40 and the element 50 is the inclined surface that defines the inwardly-recessed portion of the first hook 8. The second displacement-restriction surface 15 of each of the element 40 and the element 50 is the inclined surface that defines the inwardly-recessed portion of the second hook 9. Both the first displacement-restriction surface 14 of the first hook 8 and the second displacement-restriction surface 15 of the second hook 9 are the inclined surfaces that respectively define the inwardly-recessed portions of the first and second hooks 8, 9. Therefore, the distances $S_1$, $S_2$ can be decreased at the portions near the root portions of the first and second hooks 8, 9. Thus, relative displacement between the elements 40, 50 and the hoop 2 in the element-width direction can be reliably restricted by the first and second displacement-restriction surfaces 14, 15. As a result, the elements 40, 50 can be reliably prevented from being detached from the hoop 2.

As illustrated in FIG. 7, the shape of the first displacement-restriction surface 14 may be set so as to conform to an arc-shaped locus that is formed by the distal end (the edge 2c) of the side surface 2d of the hoop 2 when the hoop 2, of which one end portion has been temporarily inserted in the assembly space 17, is caused to pivot while the one end portion is pulled out of the assembly space 17 such that the hoop 2 is disposed onto the saddle surface 5. Similarly, the shape of the second displacement-restriction surface 15 may be set so as to conform to an arc-shaped locus that is formed by the distal end (the edge 2h) of the side surface 2e of the hoop 2. Thus, the ease of assembly of the elements 40, 50 and the hoop 2 can be improved.

Figure 12:
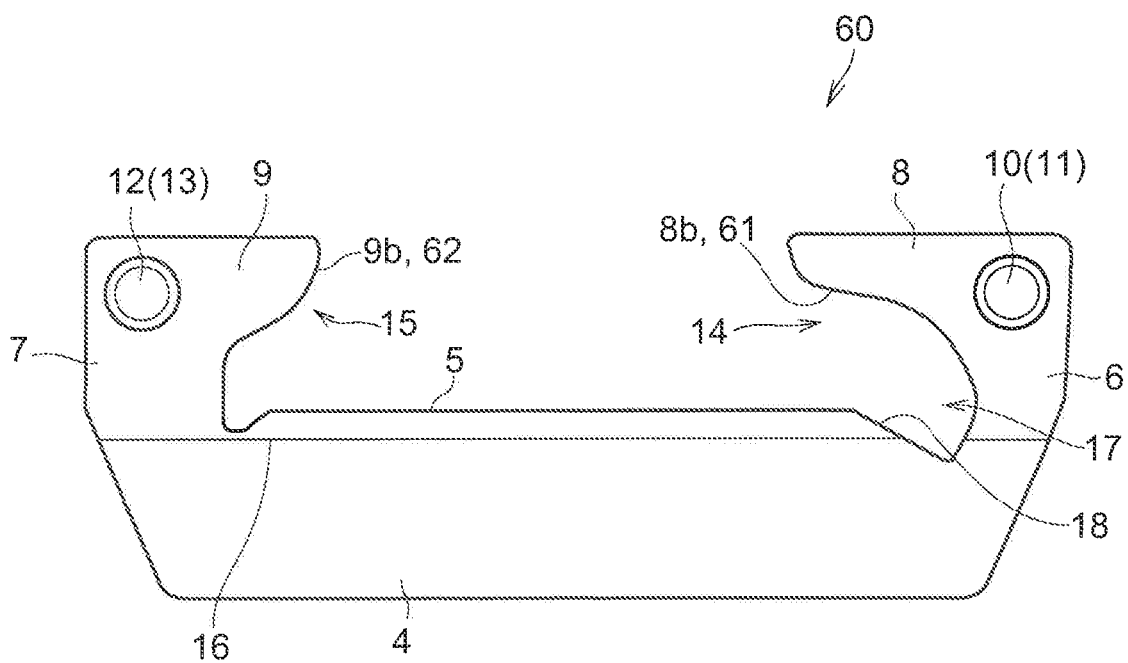
FIG. 12 is a view illustrating another example of the drive belt, FIG. 12 illustrating the configuration in which the first inclined surface of the first hook, which is the first displacement-restriction surface, is a curved surface that defines an inwardly-recessed portion of the first hook, and the second inclined surface of the second hook, which is the second displacement-restriction surface, is a curved surface that defines an outwardly-bulging portion of the second hook.

The element 60 illustrated in FIG. 12 includes a first inclined surface 61 as the first displacement-restriction surface 14 of the first hook 8, and a second inclined surface 62 as the second displacement-restriction surface 15 of the second hook 9. The first inclined surface 61 is a curved surface that is inclined with respect to the saddle surface 5 and that is curved so as to define an inwardly-recessed portion of the first hook 8. The second inclined surface 62 is a curved surface that is inclined with respect to the saddle surface 5 and that is curved so as to define an outwardly-bulging portion of the second hook 9.

Figure 13:
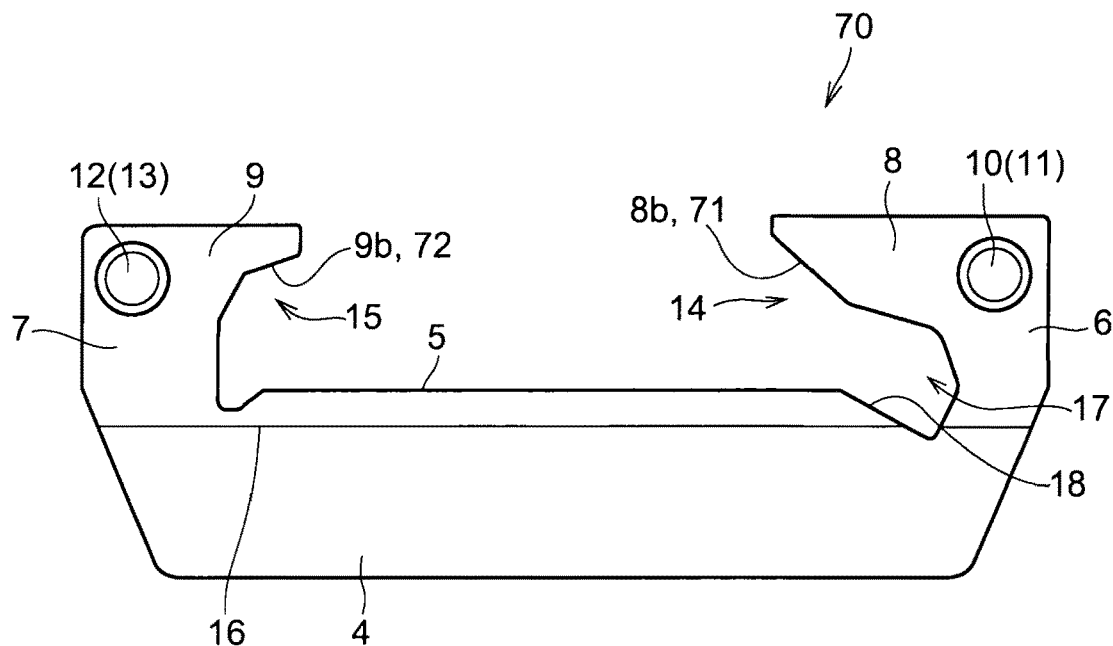
FIG. 13 is a view illustrating another example of the drive belt, FIG. 13 illustrating the configuration in which the first inclined surface of the first hook, which is the first displacement-restriction surface, is a combination of a plurality of flat surfaces that are connected to each other with an angle formed therebetween so as to define an outwardly-bulging portion of the first hook, and the second inclined surface of the second hook, which is the second displacement-restriction surface, is a combination of a plurality of flat surfaces that are connected to each other with an angle formed therebetween so as to define an inwardly-recessed portion of the second hook.

The element 70 illustrated in FIG. 13 includes a first inclined surface 71 as the first displacement-restriction surface 14 of the first hook 8, and a second inclined surface 72 as the second displacement-restriction surface 15 of the second hook 9. The first inclined surface 71 is a combination of a plurality of flat surfaces that are inclined with respect to the saddle surface 5 and that are connected to each other with an angle formed therebetween so as to define an outwardly-bulging portion of the first hook 8. The second inclined surface 72 is a combination of a plurality of flat surfaces that are inclined with respect to the saddle surface 5 and that are connected to each other with an angle formed therebetween so as to define an inwardly-recessed portion of the second hook 9. In the example illustrated in FIG. 13, each of the first inclined surface 71 and the second inclined surface 72 is a combination of two flat surfaces.

As in the examples illustrated in FIG. 12 and FIG. 13, in the drive belt 1 according to the present embodiment of the disclosure, the combination of the first and second displacement-restriction surfaces 14, 15 may be a combination of the inclined surface that defines the outwardly-bulging portion of one of the first and second hooks 8, 9 and the inclined surface that defines the inwardly-recessed portion of the other one of the first and second hooks 8, 9. When the combination of the first and second displacement-restriction surfaces 14, 15 is set to a combination of the inclined surface that defines the outwardly-bulging portion of one of the first and second hooks 8, 9 and the inclined surface that defines the inwardly-recessed portion of the other one of the first and second hooks 8, 9 based on the advantage of each of these inclined surfaces, it is possible to improve the ease of assembly of the drive belt 1 and the reliability of the drive belt 1.

Figure 14:
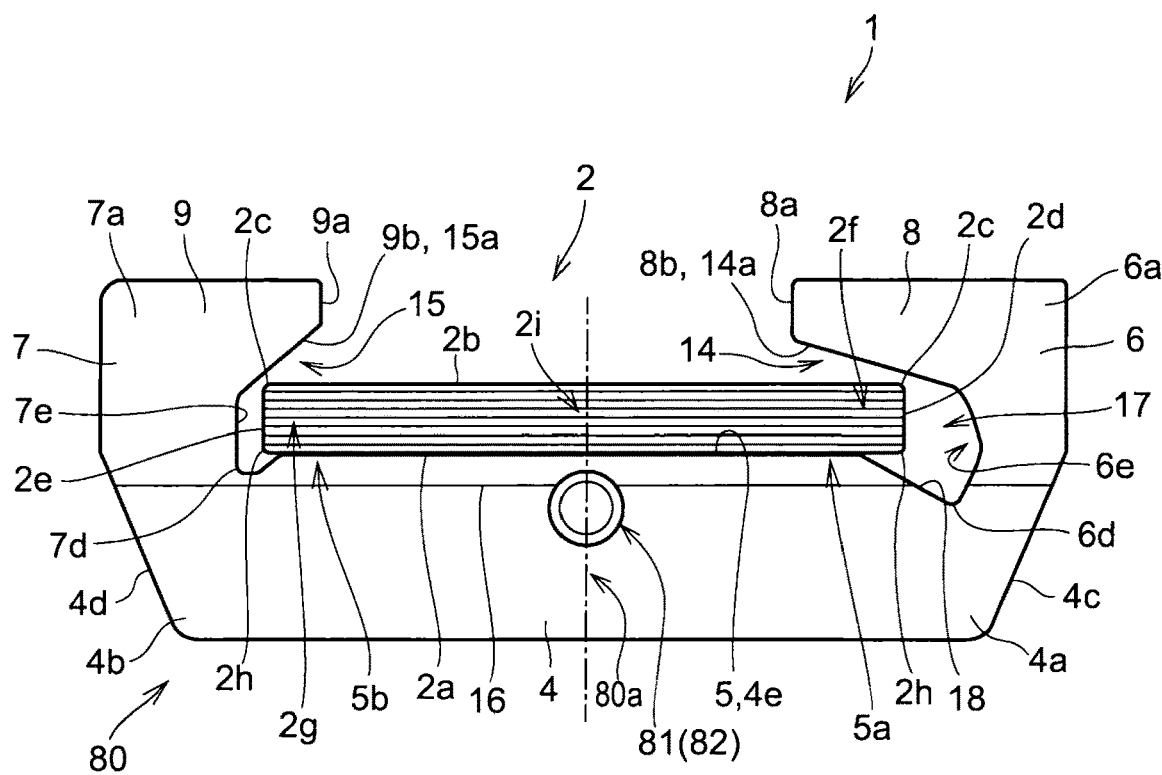
FIG. 14 is a view illustrating another example of the drive belt, FIG. 14 illustrating the configuration in which a boss and a dimple are provided at a central portion of a base portion of each element.
Figure 15:
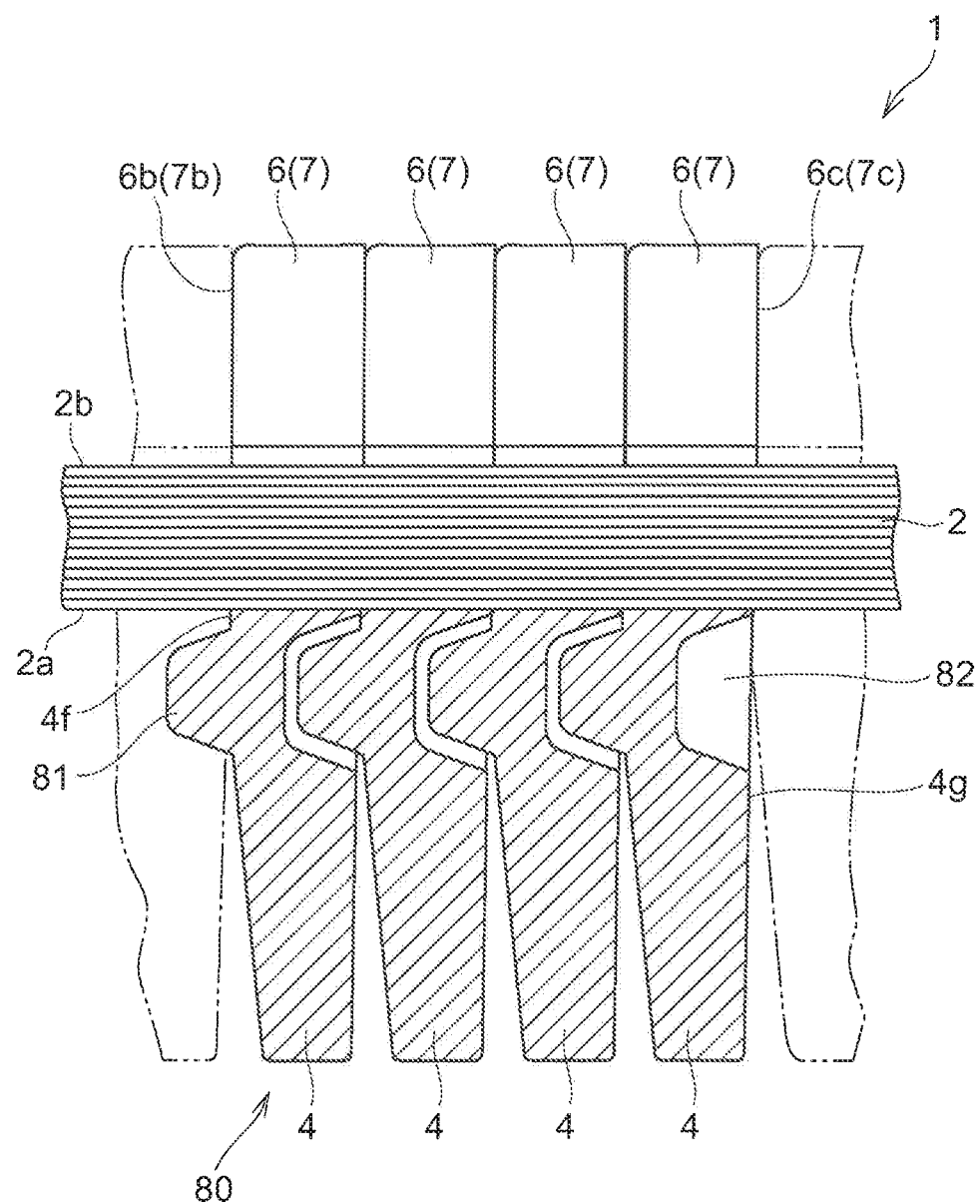
FIG. 15 is a side view (partial sectional view) illustrating the configurations of the elements and the hoop in the drive belt illustrated in FIG. 14 (i.e., the configuration in which the boss and the dimple are provided at the central portion of the base portion of each element).

In the drive belt 1 according to the present embodiment of the disclosure, for example, as illustrated in FIG. 14 and FIG. 15, a set of a boss 81 and a dimple 82 may be provided at a central portion of an element 80. In the drive belt 1 illustrated in FIG. 14 and FIG. 15, the elements that have the same configurations or functions as those of the drive belt 1 illustrated in FIG. 2 and FIG. 3 are denoted by the same reference signs as those in FIG. 2 and FIG. 3.

The drive belt 1 illustrated in FIG. 14 and FIG. 15 includes the hoop 2 and the multiple elements 80. Each element 80 has basically the same configuration as that of the element 3, except that the element 80 includes the boss 81 and the dimple 82 instead of the first boss 10, the first dimple 11, the second boss 12, and the second dimple 13 of the element 3.

The boss 81 is provided at the central portion (around a center portion 80*a*) of the base portion 4 of the element 80. Specifically, the boss 81 protrudes outwardly from a front surface 4*f* of the base portion 4, which is one of the two surfaces of the base portion 4 in the element-thickness direction (i.e., the lateral direction in FIG. 15). The boss 81 of each element 80 is configured to be loosely engaged with the dimple 82 of the adjacent element 80 when the elements 80 and the hoop 2 have been assembled together.

The dimple 82 is provided at the central portion (around the center portion 80*a*) of the base portion 4 of each element 80. Specifically, the dimple 82 is recessed inwardly from a rear surface 4*g* of the base portion 4, which is the other one of the two surfaces of the base portion 4 in the element-thickness direction. The dimple 82 of each element 80 is configured such that the boss 81 of the adjacent element 80 is loosely engaged with the dimple 82 of the element 80 when the elements 80 and the hoop 2 have been assembled together. Thus, in the drive belt 1, the boss 81 of each element 80 is engaged with the dimple 82 of the adjacent element 80 in the circumferential direction of the hoop 2.

When the bosses 81 are engaged with the dimples 82 as described above, the elements 80 adjacent to each other are aligned with each other, and relative displacement between the elements 80 adjacent to each other in each of the element-width direction (i.e., the lateral direction in FIG. 14) and the element-height direction (i.e., the up-down direction in FIG. 14 and FIG. 15) is restricted. In the example illustrated in FIG. 14 and FIG. 15, the boss 81 of each element 80 is engaged with the dimple 82 of the adjacent element 80, at one portion around the center portion 80*a* of the element 80. Therefore, although relative displacement between the adjacent elements 80 in each of the element-width direction and the element-height direction is restricted as described above, the adjacent elements 80 can rotate relative to each other about the position where the boss 81 is engaged with the dimple 82. Thus, it is possible to easily achieve the state, as illustrated in FIG. 6, where the element 80 is positioned so as to be inclined with respect to the hoop 2, by rotating the elements 80 relative to each other, for example, in the course of assembling the elements 80 and the hoop 2 together. This improves the ease of assembly of the elements 80 and the hoop 2.

Each of the element 20 illustrated in FIG. 8, the element 30 illustrated in FIG. 9, the element 40 illustrated in FIG. 10, the element 50 illustrated in FIG. 11, the element 60 illustrated in FIG. 12, and the element 70 illustrated in FIG. 13 may be provided with the boss 81 and the dimple 82 of the element 80 illustrated in FIG. 14 and FIG. 15 instead of the first boss 10, the first dimple 11, the second boss 12, and the second dimple 13.

In the drive belt 1 according to the present embodiment of the disclosure, the element 3 that is described in the foregoing example (hereinafter referred to as "first element 3") and that has the assembly space 17 provided adjacent to the first pillar 6, and a second element (not illustrated) that also has an assembly space 17 provided adjacent to the second pillar 7 may be used in combination. Thus, the drive belt 1 including the hoop 2, the first elements 3, and the second elements may be provided. The first element 3 and the second element are bilaterally symmetrical in the element-width direction. In this case, when the same number of the first elements 3 and the second elements are used, it is possible to even out the weight distribution and the stress distribution between the left side and the right side in the element-width direction. As a result, the drive belt 1 that is well-balanced can be provided.

What is claimed is:

1. A drive belt comprising:
   a hoop having a band shape, the hoop including an inner peripheral surface, an outer peripheral surface, and two side surfaces connecting the inner peripheral surface and the outer peripheral surface to each other; and
   multiple elements having a plate-piece shape, the multiple elements being arrayed and joined together in a loop by the hoop,
   wherein each of the multiple elements includes
      a base portion including a first end portion and a second end portion that are two end portions in an element-width direction of the element, the base portion including a saddle surface provided at a part of an upper end of the base portion, the part of the upper end being located between the first end portion and the second end portion, and the saddle surface being configured to come into contact with the inner peripheral surface of the hoop,
      a first pillar extending upward from the upper end of the base portion, the first pillar being provided at the first end portion of the base portion,
      a second pillar extending upward from the upper end of the base portion, the second pillar being provided at the second end portion of the base portion,
      a first hook extending from the first pillar toward the second pillar, and a second hook extending from the second pillar toward the first pillar, wherein each of the multiple elements has an assembly space provided at a position adjacent to a root portion of the first pillar and between the base portion and the first hook, the assembly space being defined such that one of two end portions of the hoop in a hoop-width direction of the hoop is inserted into the assembly space during assembly of the element and the hoop, wherein a first opening width that is a distance between a distal end of the first hook and a distal end of the second hook is less than a width of the hoop, wherein a second opening width that is a distance between a contact site and the distal end of the second hook is greater than the width of the hoop, the contact site being a site at which one of the two side surfaces of the hoop comes into contact with the first pillar when one of the two end portions of the hoop is inserted into the assembly space and brought into contact with the first pillar, wherein a first displacement-restriction surface is provided in a lower surface of the first hook, the lower surface of the first hook facing the saddle surface, and the first displacement-restriction surface being configured to restrict relative displacement between the element and the hoop by coming into contact with one of two upper edges of the outer peripheral surface of the hoop when the element and the hoop disposed on the saddle surface are displaced relative to each other in the element-width direction, wherein a second displacement-restriction surface is provided in a lower surface of the second hook, the lower surface of the second hook facing the saddle surface, and the second displacement-restriction surface being configured to restrict relative displacement between the element and the hoop by coming into contact with the other one of the two upper edges of the outer peripheral surface of the hoop when the element and the hoop disposed on the saddle surface are displaced relative to each other in the element-width direction, wherein the first displacement-restriction surface is a first inclined surface configured such that a distance between the first displacement-restriction surface and a predetermined virtual plane that includes the saddle surface and that is flush with the saddle surface is greater than a thickness of the hoop at a position close to a center portion of the saddle surface and is less than the thickness of the hoop at a position apart from the hoop disposed on the saddle surface, in a direction toward the first pillar along the element-width direction; and wherein the second displacement-restriction surface is a second inclined surface configured such that a distance between the second displacement-restriction surface and the predetermined virtual plane is greater than the thickness of the hoop at a position close to the center portion of the saddle surface and is less than the thickness of the hoop at a position apart from the hoop disposed on the saddle surface, in a direction toward the second pillar along the element-width direction.

2. The drive belt according to claim 1, wherein at least one of the first inclined surface and the second inclined surface is a curved surface or a combination of a plurality of flat surfaces having different inclinations with respect to the saddle surface.

3. The drive belt according to claim 2, wherein the assembly space is a space defined by the first inclined surface, an inner wall surface of the first pillar, the inner wall surface facing the second pillar, and a guide surface that is a curved surface or a flat surface extending from an end portion of the saddle surface, the end portion being on the first pillar side, and the guide surface being inclined with respect to the saddle surface in the same direction as a direction in which the first inclined surface is inclined with respect to the saddle surface.

4. The drive belt according to claim 1, wherein at least one of the first inclined surface and the second inclined surface is a flat surface inclined at a predetermined inclination with respect to the saddle surface.

5. The drive belt according to claim 1, wherein each of the elements is configured such that the second opening width is greater than a diagonal distance of the hoop, the diagonal distance being a distance between one of the two edges of the outer peripheral surface of the hoop and one of two edges of the inner peripheral surface of the hoop, and the one of the two edges of the outer peripheral surface being located diagonal to the one of two edges of the inner peripheral surface.

6. The drive belt according to claim 1, wherein
each of the multiple elements includes:
a first boss protruding outwardly from a front surface of the first pillar, the front surface of the first pillar being one of two surfaces of the first pillar in a plate-thickness direction of the element;
a first dimple recessed inwardly from a rear surface of the first pillar, the rear surface of the first pillar being the other one of the two surfaces of the first pillar in the plate-thickness direction;
a second boss protruding outwardly from a front surface of the second pillar, the front surface of the second pillar being one of two surfaces of the second pillar in the plate-thickness direction; and
a second dimple recessed inwardly from a rear surface of the second pillar, the rear surface of the second pillar being the other one of the two surfaces of the second pillar in the plate-thickness direction, wherein
the first boss of each of the multiple elements is engaged with the first dimple of an adjacent one of the multiple elements in a circumferential direction of the hoop, and
the second boss of each of the multiple elements is engaged with the second dimple of an adjacent one of the multiple elements in the circumferential direction of the hoop.

7. The drive belt according to claim 1, wherein
each of the multiple elements includes:
a boss provided at a central portion of the base portion in the element-width direction, the boss protruding outwardly from a front surface of the base portion, and the front surface of the base portion being one of two surfaces of the base portion in a plate-thickness direction of the element; and
a dimple provided at the central portion of the base portion in the element-width direction, the dimple being recessed inwardly from a rear surface of the base portion, and the rear surface of the base portion being the other one of the two surfaces of the base portion in the plate-thickness direction, wherein
the boss of each of the multiple elements is engaged with the dimple of an adjacent one of the multiple elements in a circumferential direction of the hoop.

* * * * *